United States Patent
Kakei et al.

(10) Patent No.: US 12,362,532 B2
(45) Date of Patent: Jul. 15, 2025

(54) FIBER STRUCTURE, PULSE LASER DEVICE, SUPERCONTINUUM LIGHT SOURCE, AND PRODUCTION METHOD FOR FIBER STRUCTURE

(71) Applicant: HAMAMATSU PHOTONICS K.K., Hamamatsu (JP)

(72) Inventors: Ryota Kakei, Hamamatsu (JP); Shin Kato, Hamamatsu (JP); Masaru Shimomaki, Hamamatsu (JP); Fumitsugu Fukuyo, Hamamatsu (JP); Tomoya Nakazawa, Hamamatsu (JP); Yu Matsushiro, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 1128 days.

(21) Appl. No.: 17/285,246

(22) PCT Filed: Jul. 11, 2019

(86) PCT No.: PCT/JP2019/027586
§ 371 (c)(1),
(2) Date: Apr. 14, 2021

(87) PCT Pub. No.: WO2020/084843
PCT Pub. Date: Apr. 30, 2020

(65) Prior Publication Data
US 2021/0376554 A1    Dec. 2, 2021

(30) Foreign Application Priority Data
Oct. 26, 2018 (JP) ................. 2018-202250

(51) Int. Cl.
*H01S 3/1115* (2023.01)
*G02F 1/365* (2006.01)
(Continued)

(52) U.S. Cl.
CPC ............ *H01S 3/1115* (2013.01); *G02F 1/365* (2013.01); *H01S 3/0057* (2013.01);
(Continued)

(58) Field of Classification Search
CPC .... H01S 3/1115; H01S 3/0057; H01S 3/0092; H01S 3/06754; H01S 3/06791;
(Continued)

(56) References Cited

U.S. PATENT DOCUMENTS

2006/0198399 A1*  9/2006  Jablonski ............ H01S 3/06791
                                                        372/18
2007/0086707 A1    4/2007  Suzuki et al.
(Continued)

FOREIGN PATENT DOCUMENTS

CN       1882861 A    12/2006
CN     105161967 A    12/2015
(Continued)

OTHER PUBLICATIONS

A. V. Tausenev et al., "erbium-doped fiber laser mode locked with a cellulose polymer film containing single-wall carbon nanotubes." Appl. Phys. Lett. Apr. 28, 2008; 92 (17): 171113 (Year: 2008).*
(Continued)

*Primary Examiner* — Xinning (Tom) Niu
(74) *Attorney, Agent, or Firm* — Faegre Drinker Biddle & Reath LLP

(57) ABSTRACT

A fiber structure includes first and second optical fibers disposed such that tip portions thereof butt and a sheet-shaped saturable absorber sandwiched between the tip portion of the first optical fiber and the tip portion of the second optical fiber. Each of the tip portions of the first optical fiber and the second optical fiber has a core, a cladding provided around the core, and a ferrule provided around the cladding. The tip portion of the first optical fiber has a protruding shape protruding to a tip side. The saturable absorber has an adhering part at least adhering to the core of the first optical fiber and a non-adhering part present around the adhering part and not adhering to the tip portion of the first optical fiber.

18 Claims, 18 Drawing Sheets

(51) Int. Cl.
*H01S 3/00* (2006.01)
*H01S 3/067* (2006.01)
*H01S 3/094* (2006.01)
*H01S 3/0941* (2006.01)

(52) U.S. Cl.
CPC ........ *H01S 3/0092* (2013.01); *H01S 3/06754* (2013.01); *H01S 3/06791* (2013.01); *H01S 3/094003* (2013.01); *H01S 3/0941* (2013.01)

(58) Field of Classification Search
CPC ............ H01S 3/094003; H01S 3/0941; H01S 3/1118; G02F 1/365; G02F 1/3523; G02B 6/3845
See application file for complete search history.

(56) References Cited

U.S. PATENT DOCUMENTS

| | | | |
|---|---|---|---|
| 2012/0039344 A1* | 2/2012 | Kian | H01S 3/1118 372/98 |
| 2017/0150880 A1* | 6/2017 | Thomsen | H01S 5/0657 |

FOREIGN PATENT DOCUMENTS

| | | |
|---|---|---|
| JP | 2004-260077 A | 9/2004 |
| JP | 2005-321483 A | 11/2005 |
| JP | 2005-322864 A | 11/2005 |
| JP | 2005-351998 A | 12/2005 |
| JP | 2008-058411 A | 3/2008 |
| JP | 2008-112163 A | 5/2008 |
| JP | 2008-176135 A | 7/2008 |
| JP | 4514130 B2 | 7/2010 |
| JP | 2012-032727 A | 2/2012 |
| JP | 2012-199335 A | 10/2012 |
| JP | 2015-118348 A | 6/2015 |
| JP | 2017-067804 A | 4/2017 |
| KR | 10-2012-0122310 A | 11/2012 |
| WO | WO-2004/059806 A2 | 7/2004 |

OTHER PUBLICATIONS

A. V. Tausenev et al., "Ultrashort-pulse erbium-doped fibre laser using a saturable absorber based on single-wall carbon nanotubes synthesised by the arc-discharge method", Quantum Electronics., vol. 37, No. 9, Sep. 30, 2007, p. 847-p. 852, XP055248328.

International Preliminary Report on Patentability mailed May 6, 2021 for PCT/JP2019/027586.

* cited by examiner (a)

(b)

(a)

(b)

(a)

(b)

(a)

(b)

FIBER STRUCTURE, PULSE LASER DEVICE, SUPERCONTINUUM LIGHT SOURCE, AND PRODUCTION METHOD FOR FIBER STRUCTURE

TECHNICAL FIELD

One aspect of the present invention relates to a fiber structure, a pulse laser device, a supercontinuum light source, and a production method for a fiber structure.

BACKGROUND ART

As an example of fiber structure-related techniques of the related art, Patent Literature 1 describes an optical element in which graphene is attached to a fiber end surface as a saturable absorber for a fiber laser.

CITATION LIST

Patent Literature

Patent Literature 1: U.S. Patent Application Publication No. 2012/0039344

SUMMARY OF INVENTION

Technical Problem

In the related art, the adhesiveness between the saturable absorber and the optical fiber may not be sufficient and there is room for improvement in terms of the adhesiveness between the saturable absorber and the optical fiber.

In this regard, an object of one aspect of the present invention is to provide a fiber structure, a pulse laser device, a supercontinuum light source, and a production method for a fiber structure enabling adhesiveness enhancement between a saturable absorber and an optical fiber.

Solution to Problem

A fiber structure according to one aspect of the present invention includes first and second optical fibers disposed such that tip portions thereof butt and a sheet-shaped saturable absorber sandwiched between the tip portion of the first optical fiber and the tip portion of the second optical fiber. Each of the tip portions of the first optical fiber and the second optical fiber has a core, a cladding provided around the core, and a ferrule provided around the cladding. The tip portion of the first optical fiber has a protruding shape protruding to a tip side. The saturable absorber has an adhering part at least adhering to the core of the first optical fiber and a non-adhering part present around the adhering part and not adhering to the tip portion of the first optical fiber.

In the fiber structure, the saturable absorber sandwiched between the tip portion of the first optical fiber and the tip portion of the second optical fiber has the adhering part at least adhering to the core of the first optical fiber and the non-adhering part present around the adhering part and not adhering to the tip portion of the first optical fiber when viewed in the thickness direction of the saturable absorber. In other words, between the saturable absorber and the tip portion of the first optical fiber, a play part where these do not adhere is present. Accordingly, even if air bubbles are generated between the saturable absorber and the tip portion when, for example, the saturable absorber is placed in the tip portion of the first optical fiber, the air bubbles are capable of easily escaping to the surrounding space by means of the play part and it is possible to suppress the air bubbles having an effect to cause a decline in the adhesiveness between the saturable absorber and the first optical fiber. In other words, the adhesiveness between the saturable absorber and the first optical fiber can be enhanced.

In the fiber structure according to one aspect of the present invention, the adhering part may adhere to the core and the cladding of the first optical fiber. The tip portion of the first optical fiber and the tip portion of the second optical fiber may butt such that a dent corresponding to a shape of the cladding of the first optical fiber adhering at the adhering part is formed in the saturable absorber. In this case, the first optical fiber and the second optical fiber are capable of sandwiching the saturable absorber with sufficient force, the heat conduction of the saturable absorber, eventually thermal diffusion, is improved, the life of the saturable absorber can be extended, and durability enhancement can be achieved.

In the fiber structure according to one aspect of the present invention, the tip portion of the second optical fiber may have a protruding shape protruding to a tip side. The adhering part may at least adhere to the core of the second optical fiber. The non-adhering part may not adhere to the tip portion of the second optical fiber. In this case, between the saturable absorber and the tip portion of the second optical fiber, a play part where these do not adhere is present. Accordingly, even if air bubbles are generated between, for example, the saturable absorber and the second optical fiber, the air bubbles are capable of easily escaping to the surrounding space by means of the play part and it is possible to suppress the air bubbles having an effect to cause a decline in the adhesiveness between the saturable absorber and the second optical fiber. In other words, the adhesiveness between the saturable absorber and the second optical fiber can be enhanced.

In the fiber structure according to one aspect of the present invention, the adhering part may adhere to the core and the cladding of the second optical fiber. The tip portion of the first optical fiber and the tip portion of the second optical fiber may butt such that a dent corresponding to a shape of the cladding of the second optical fiber adhering at the adhering part is formed in the saturable absorber. In this case, the first optical fiber and the second optical fiber are capable of sandwiching the saturable absorber with sufficient force, the heat conduction of the saturable absorber, eventually thermal diffusion, is improved, the life of the saturable absorber can be extended, and durability enhancement can be achieved.

In the fiber structure according to one aspect of the present invention, an outer edge of the saturable absorber may be positioned inside an outer edge of at least one of the first optical fiber and the second optical fiber when viewed in a thickness direction of the saturable absorber. In this case, the saturable absorber is less likely to peel off than in a case where, for example, the outer edge of the saturable absorber is positioned outside the outer edges of the first optical fiber and the second optical fiber when viewed in the thickness direction. As a result, the adhesiveness between the saturable absorber and at least one of the first and second optical fibers can be further enhanced.

A fiber structure according to one aspect of the present invention includes first and second optical fibers disposed such that tip portions thereof butt and a sheet-shaped saturable absorber sandwiched between the tip portion of the first optical fiber and the tip portion of the second optical fiber. An outer edge of the saturable absorber is positioned inside an outer edge of at least one of the first optical fiber and the second optical fiber when viewed in a thickness direction of the saturable absorber.

In the fiber structure, the outer edge of the saturable absorber is positioned inside the outer edge of at least one of the first optical fiber and the second optical fiber when viewed in the thickness direction of the saturable absorber. Accordingly, the saturable absorber is less likely to peel off than in a case where, for example, the outer edge of the saturable absorber is positioned outside the outer edges of the first optical fiber and the second optical fiber when viewed in the thickness direction. As a result, the adhesiveness between the saturable absorber and at least one of the first and second optical fibers can be enhanced.

In the fiber structure according to one aspect of the present invention, the saturable absorber may have a polygonal shape in which a corner portion is square-chamfered or round-chamfered when viewed in the thickness direction of the saturable absorber. In this case, the saturable absorber is less likely to peel off than in a case where the saturable absorber is not chamfered. As a result, the adhesiveness between the saturable absorber and the first optical fiber can be further enhanced.

In the fiber structure according to one aspect of the present invention, the saturable absorber may have a circular shape, an elliptical shape, or an oval shape when viewed in the thickness direction of the saturable absorber. In this case, the saturable absorber is less likely to peel off than in a case where the saturable absorber has, for example, a polygonal shape. As a result, the adhesiveness between the saturable absorber and the first optical fiber can be further enhanced.

In the fiber structure according to one aspect of the present invention, the saturable absorber may contain a sheet-shaped resin and a plurality of carbon nanotubes dispersed in the resin. In this case, the saturable absorber can be formed from the resin and the carbon nanotubes.

A pulse laser device according to one aspect of the present invention includes the fiber structure. In the pulse laser device as well as the fiber structure, the adhesiveness between the saturable absorber and the first optical fiber can be enhanced.

A supercontinuum light source according to one aspect of the present invention includes the pulse laser device. In the supercontinuum light source as well as the fiber structure, the adhesiveness between the saturable absorber and the first optical fiber can be enhanced.

A production method for a fiber structure according to one aspect of the present invention includes a first step of preparing a sheet-shaped saturable absorption material and first and second optical fibers, a second step of forming a sheet-shaped saturable absorber by punching the saturable absorption material, a third step of adsorbing the saturable absorber with an adsorption instrument, a fourth step of placing the saturable absorber adsorbed by the adsorption instrument in a tip portion of the first optical fiber, and a fifth step of causing the tip portion of the first optical fiber and a tip portion of the second optical fiber to butt such that the saturable absorber is sandwiched between the tip portion of the first optical fiber and the tip portion of the second optical fiber. Each of the tip portions of the first optical fiber and the second optical fiber has a core, a cladding provided around the core, and a ferrule provided around the cladding. The tip portion of the first optical fiber has a protruding shape protruding to a tip side. In the fourth step, the saturable absorber is placed in the tip portion of the first optical fiber such that an adhering part at least adhering to the core of the first optical fiber and a non-adhering part present around the adhering part and not adhering to the tip portion of the first optical fiber are formed in the saturable absorber.

In the fourth step of the production method for a fiber structure, the saturable absorber is placed in the tip portion of the first optical fiber such that the adhering part at least adhering to the core of the first optical fiber and the non-adhering part present around the adhering part and not adhering to the tip portion of the first optical fiber are formed in the saturable absorber. In other words, between the saturable absorber and the tip portion of the first optical fiber, a play part where these do not adhere is present. Accordingly, even if air bubbles are generated between the saturable absorber and the tip portion when, for example, the saturable absorber is placed in the tip portion of the first optical fiber, the air bubbles are capable of easily escaping to the surrounding space by means of the play part and it is possible to suppress the air bubbles having an effect to cause a decline in the adhesiveness between the saturable absorber and the first optical fiber. In other words, the adhesiveness between the saturable absorber and the first optical fiber can be enhanced. As a result, after the fourth step, falling of the saturable absorber from the tip portion of the first optical fiber is suppressed.

In the production method for a fiber structure according to one aspect of the present invention, in the fourth step, the saturable absorber may be placed in the tip portion of the first optical fiber such that the adhering part adheres to the core and the cladding of the first optical fiber. In the fifth step, the tip portion of the first optical fiber and the tip portion of the second optical fiber may be caused to butt such that a dent corresponding to a shape of the cladding of the first optical fiber adhering at the adhering part is formed in the saturable absorber. In this case, the first optical fiber and the second optical fiber are capable of sandwiching the saturable absorber with sufficient force, the heat conduction of the saturable absorber, eventually thermal diffusion, is improved, the life of the saturable absorber can be extended, and durability enhancement can be achieved.

In the production method for a fiber structure according to one aspect of the present invention, the tip portion of the second optical fiber may have a protruding shape protruding to a tip side. In the fifth step, the tip portion of the first optical fiber and the tip portion of the second optical fiber may be caused to butt such that the adhering part at least adheres to the core of the second optical fiber and the non-adhering part does not adhere to the tip portion of the second optical fiber. In this case, between the saturable absorber and the tip portion of the second optical fiber, a play part where these do not adhere is present. Accordingly, even if air bubbles are generated between, for example, the saturable absorber and the second optical fiber with the tip portion of the first optical fiber and the tip portion of the second optical fiber butting, the air bubbles are capable of easily escaping to the surrounding space by means of the play part and it is possible to suppress the air bubbles having an effect to cause a decline in the adhesiveness between the saturable absorber and the second optical fiber. In other words, the adhesiveness between the saturable absorber and the second optical fiber can be enhanced.

In the production method for a fiber structure according to one aspect of the present invention, in the fifth step, the tip portion of the first optical fiber and the tip portion of the second optical fiber may be caused to butt such that a dent corresponding to a shape of the cladding of the second optical fiber adhering at the adhering part is formed in the saturable absorber. In this case, the first optical fiber and the second optical fiber are capable of sandwiching the saturable absorber with sufficient force, the heat conduction of the saturable absorber, eventually thermal diffusion, is improved, the life of the saturable absorber can be extended, and durability enhancement can be achieved.

In the production method for a fiber structure according to one aspect of the present invention, in the fourth step, the saturable absorber may be placed in the tip portion of the first optical fiber such that an outer edge of the saturable absorber is positioned inside an outer edge of the first optical fiber when viewed in a thickness direction of the saturable absorber. In this case, the saturable absorber is less likely to peel off than in a case where, for example, the saturable absorber is placed in the tip portion of the first optical fiber such that the outer edge of the saturable absorber is positioned outside the outer edge of the first optical fiber when viewed in the thickness direction. As a result, the adhesiveness between the saturable absorber and the first optical fiber can be further enhanced.

In the production method for a fiber structure according to one aspect of the present invention, in the fifth step, the tip portion of the first optical fiber and the tip portion of the second optical fiber may be caused to butt such that the outer edge of the saturable absorber is positioned inside an outer edge of the second optical fiber when viewed in the thickness direction of the saturable absorber. In this case, the saturable absorber is less likely to peel off than in a case where, for example, the tip portion of the first optical fiber and the tip portion of the second optical fiber butt such that the outer edge of the saturable absorber is positioned outside the outer edge of the second optical fiber when viewed in the thickness direction of the saturable absorber. As a result, the adhesiveness between the saturable absorber and the second optical fiber can be further enhanced.

In the production method for a fiber structure according to one aspect of the present invention, in the fourth step, a Newton ring containing interference fringes generated at the non-adhering part of the saturable absorber may be formed in the saturable absorber. In this case, by observing the Newton ring, it is possible to easily grasp the state where the adhering part of the saturable absorber at least adheres to the core and the non-adhering part of the saturable absorber does not adhere to the tip portion of the first optical fiber.

A production method for a fiber structure according to one aspect of the present invention includes a first step of preparing a sheet-shaped saturable absorption material and first and second optical fibers, a second step of forming a sheet-shaped saturable absorber by punching the saturable absorption material, a third step of adsorbing the saturable absorber with an adsorption instrument, a fourth step of placing the saturable absorber adsorbed by the adsorption instrument in a tip portion of the first optical fiber, and a fifth step of causing the tip portion of the first optical fiber and a tip portion of the second optical fiber to butt such that the saturable absorber is sandwiched between the tip portion of the first optical fiber and the tip portion of the second optical fiber. In the fourth step, the saturable absorber is placed in the tip portion of the first optical fiber such that an outer edge of the saturable absorber is positioned inside an outer edge of the first optical fiber when viewed in a thickness direction of the saturable absorber.

In the fourth step of the production method for a fiber structure, the saturable absorber is placed in the tip portion of the first optical fiber such that the outer edge of the saturable absorber is positioned inside the outer edge of the first optical fiber when viewed in the thickness direction. Accordingly, the saturable absorber is less likely to peel off than in a case where, for example, the saturable absorber is placed in the tip portion of the first optical fiber such that the outer edge of the saturable absorber is positioned outside the outer edge of the first optical fiber when viewed in the thickness direction. As a result, the adhesiveness between the saturable absorber and the first optical fiber can be enhanced.

In the production method for a fiber structure according to one aspect of the present invention, in the fifth step, the tip portion of the first optical fiber and the tip portion of the second optical fiber may be caused to butt such that the outer edge of the saturable absorber is positioned inside an outer edge of the second optical fiber when viewed in the thickness direction of the saturable absorber. In this case, the saturable absorber is less likely to peel off than in a case where, for example, the tip portion of the first optical fiber and the tip portion of the second optical fiber butt such that the outer edge of the saturable absorber is positioned outside the outer edge of the second optical fiber when viewed in the thickness direction of the saturable absorber. As a result, the adhesiveness between the saturable absorber and the second optical fiber can be enhanced.

The production method for a fiber structure according to one aspect of the present invention may further include a sixth step of accommodating the tip portion of the first optical fiber and the tip portion of the second optical fiber in a housing. In this case, the saturable absorber is accommodated in the housing together with the tip portion of the first optical fiber and the tip portion of the second optical fiber. As a result, deterioration of the saturable absorber attributable to oxidation can be suppressed. As a result, the life of the saturable absorber can be sufficient and durability enhancement can be achieved.

In the production method for a fiber structure according to one aspect of the present invention, the saturable absorber may have a polygonal shape in which a corner portion is square-chamfered or round-chamfered when viewed in the thickness direction of the saturable absorber. In this case, the saturable absorber is less likely to peel off than in a case where the saturable absorber is not chamfered. As a result, the adhesiveness between the saturable absorber and the first optical fiber can be further enhanced.

In the production method for a fiber structure according to one aspect of the present invention, the saturable absorber may have a circular shape, an elliptical shape, or an oval shape when viewed in the thickness direction of the saturable absorber. In this case, the saturable absorber is less likely to peel off than in a case where the saturable absorber has, for example, a polygonal shape. As a result, the adhesiveness between the saturable absorber and the first optical fiber can be further enhanced.

Advantageous Effects of Invention

According to one aspect of the present invention, it is possible to provide a fiber structure, a pulse laser device, a supercontinuum light source, and a production method for a fiber structure enabling adhesiveness enhancement between a saturable absorber and an optical fiber.

Figure 3:
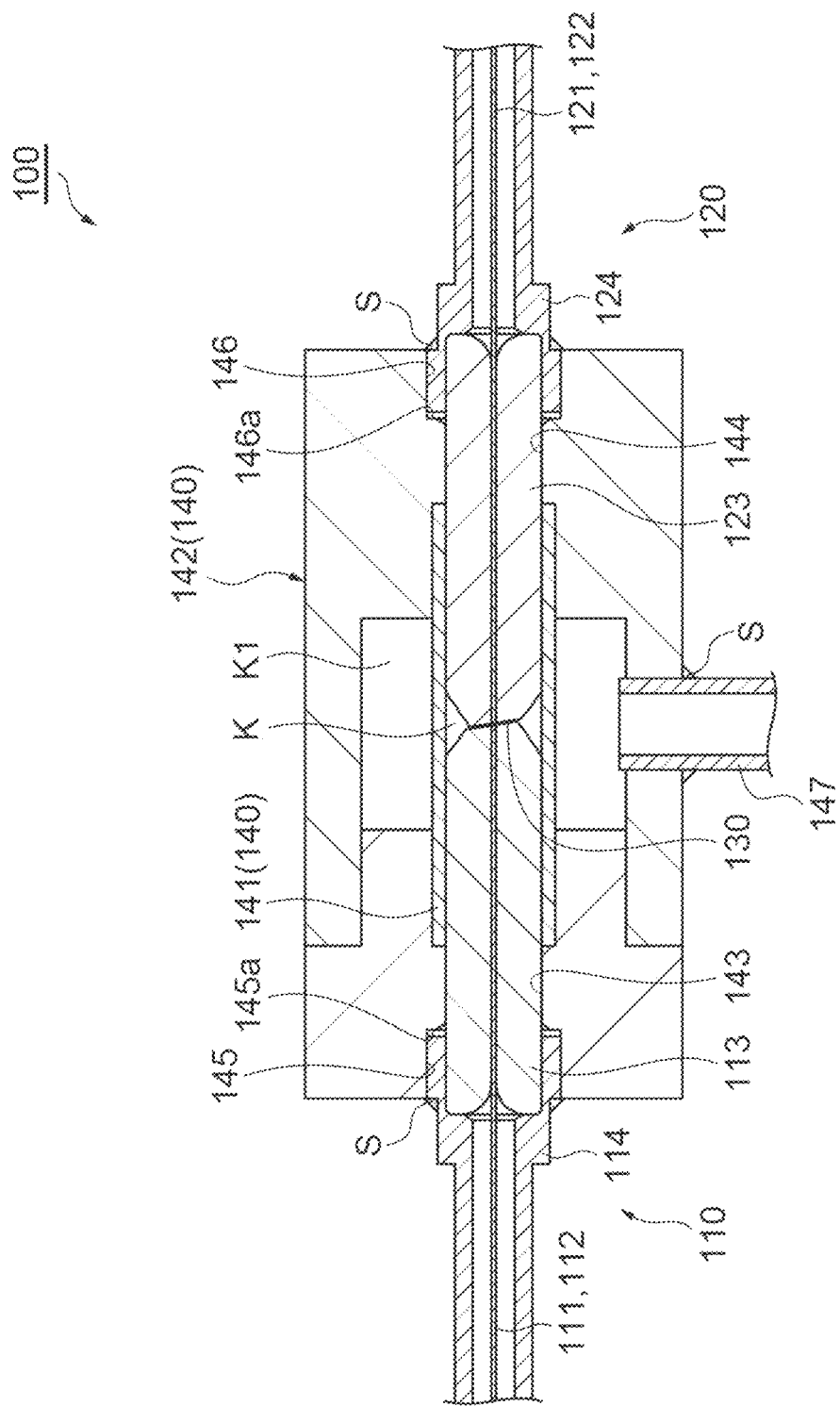
FIG. 3 is a vertical cross-sectional view illustrating a fiber structure of FIG. 1.
Figure 6:
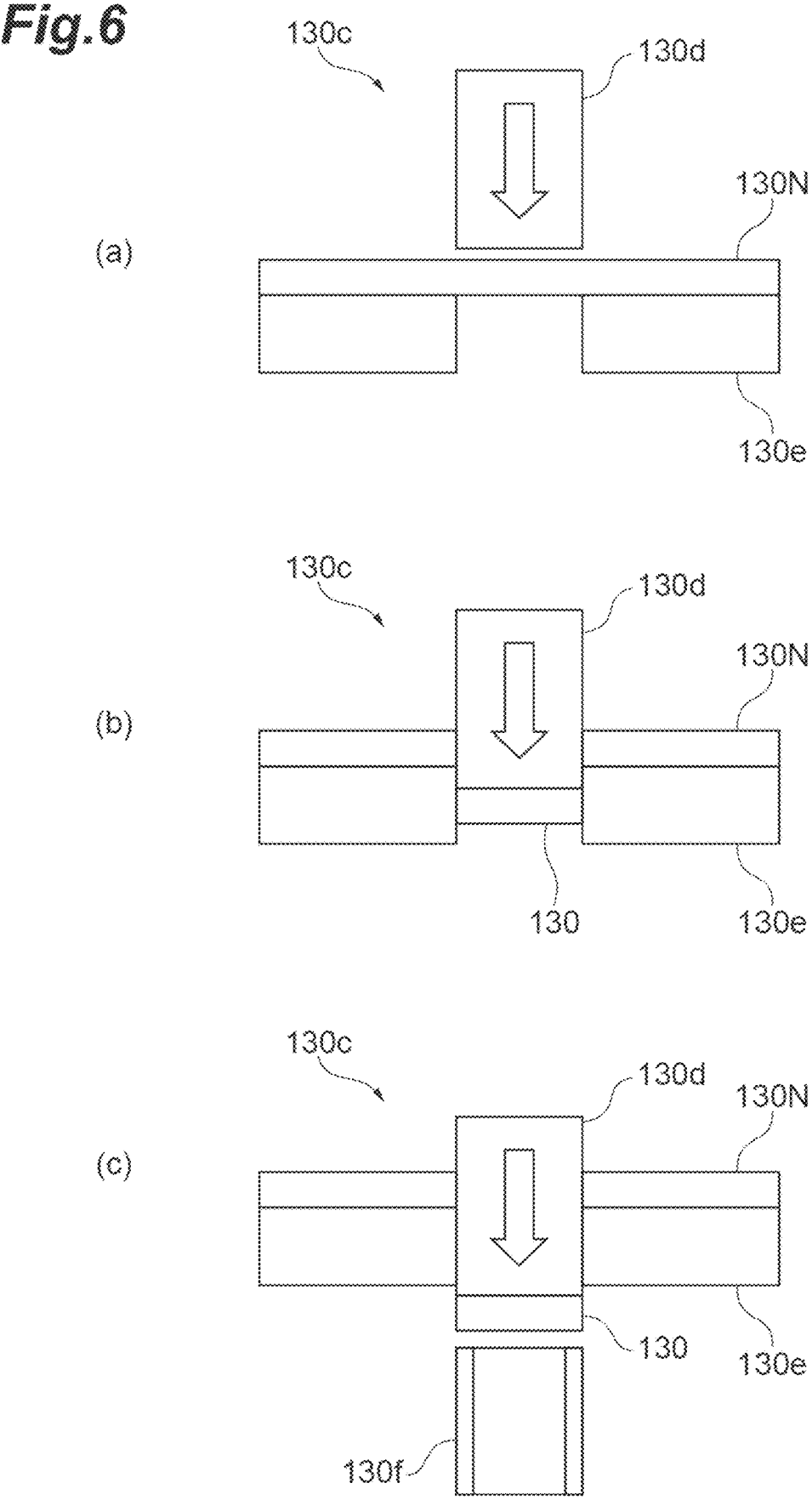

(a) of FIG. 6 is a diagram illustrating a method for producing the fiber structure of FIG. 3. (b) of FIG. 6 is a diagram illustrating a continuation of (a) of FIG. 6. (c) of FIG. 6 is a diagram illustrating a continuation of (b) of FIG. 6.

Figure 7:
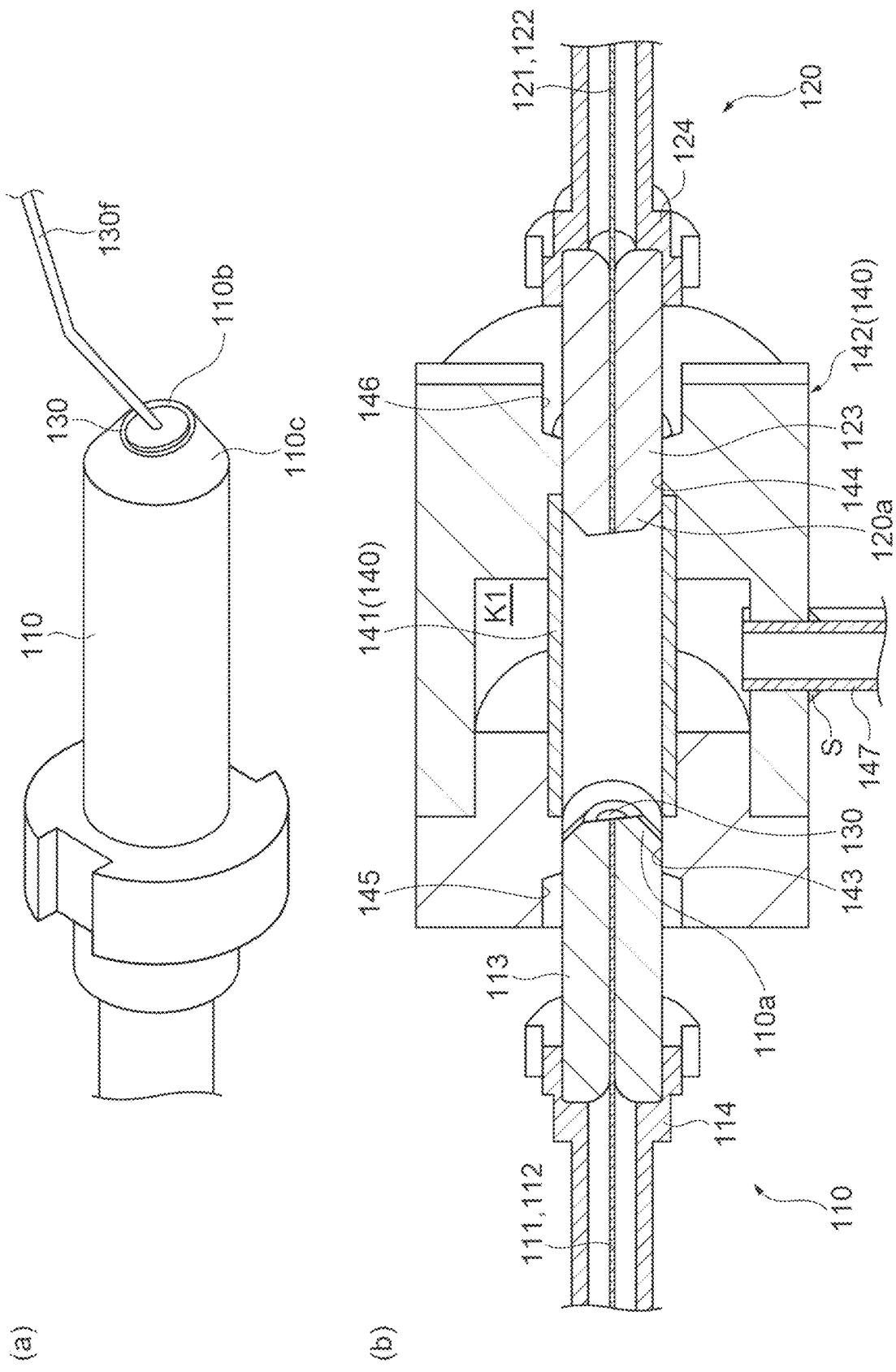

(a) of FIG. 7 is a diagram illustrating a continuation of (c) of FIG. 6. (b) of FIG. 7 is a diagram illustrating a continuation of (a) of FIG. 7.

Figure 8:
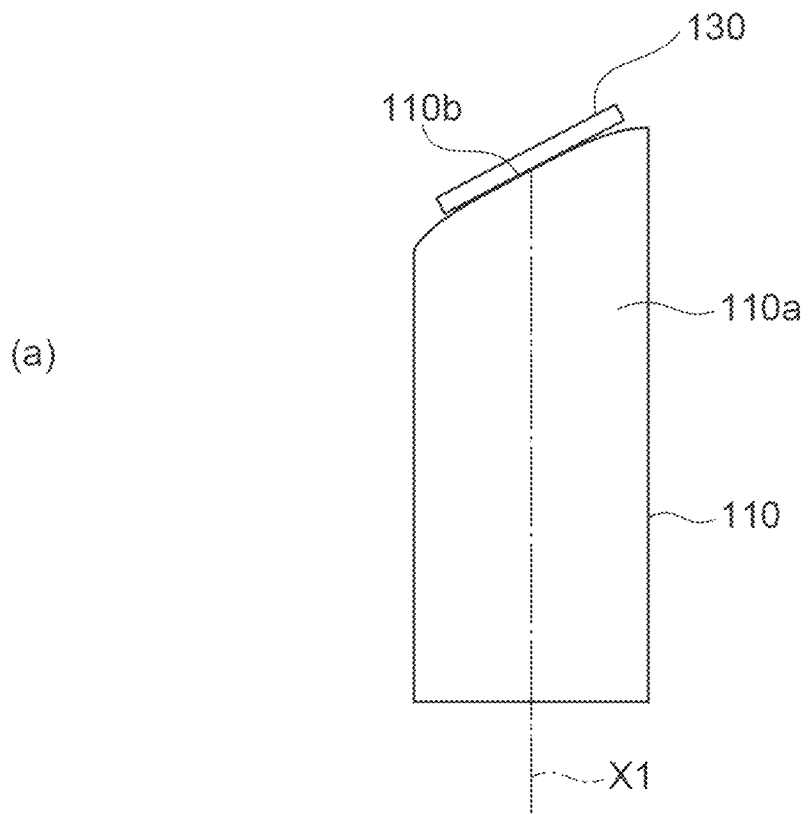
Figure 8:
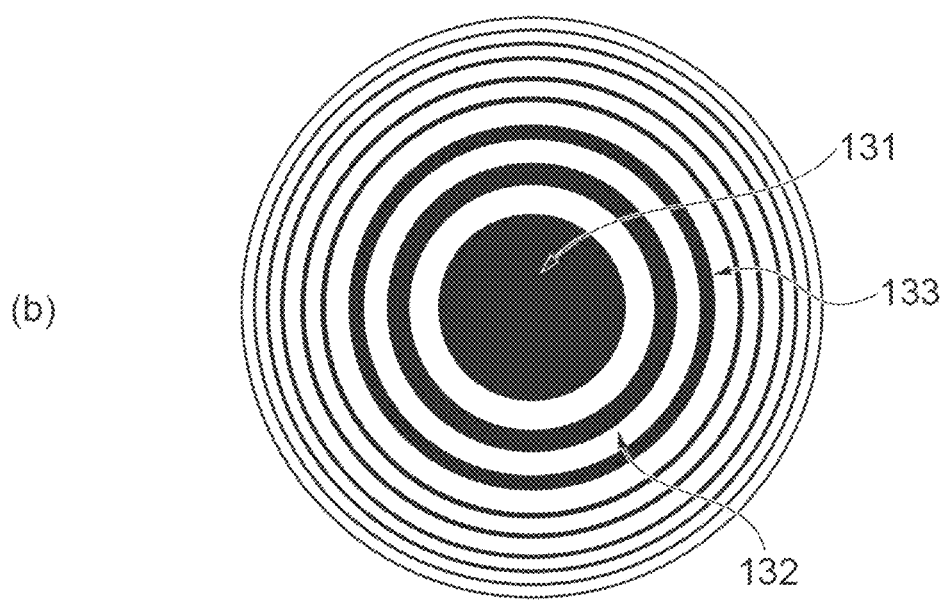

(a) of FIG. 8 is a side view schematically illustrating a saturable absorber placed in the tip portion of a first optical fiber. (b) of FIG. 8 is a schematic diagram illustrating a Newton ring observed in the saturable absorber of (a) of FIG. 8.

Figure 9:
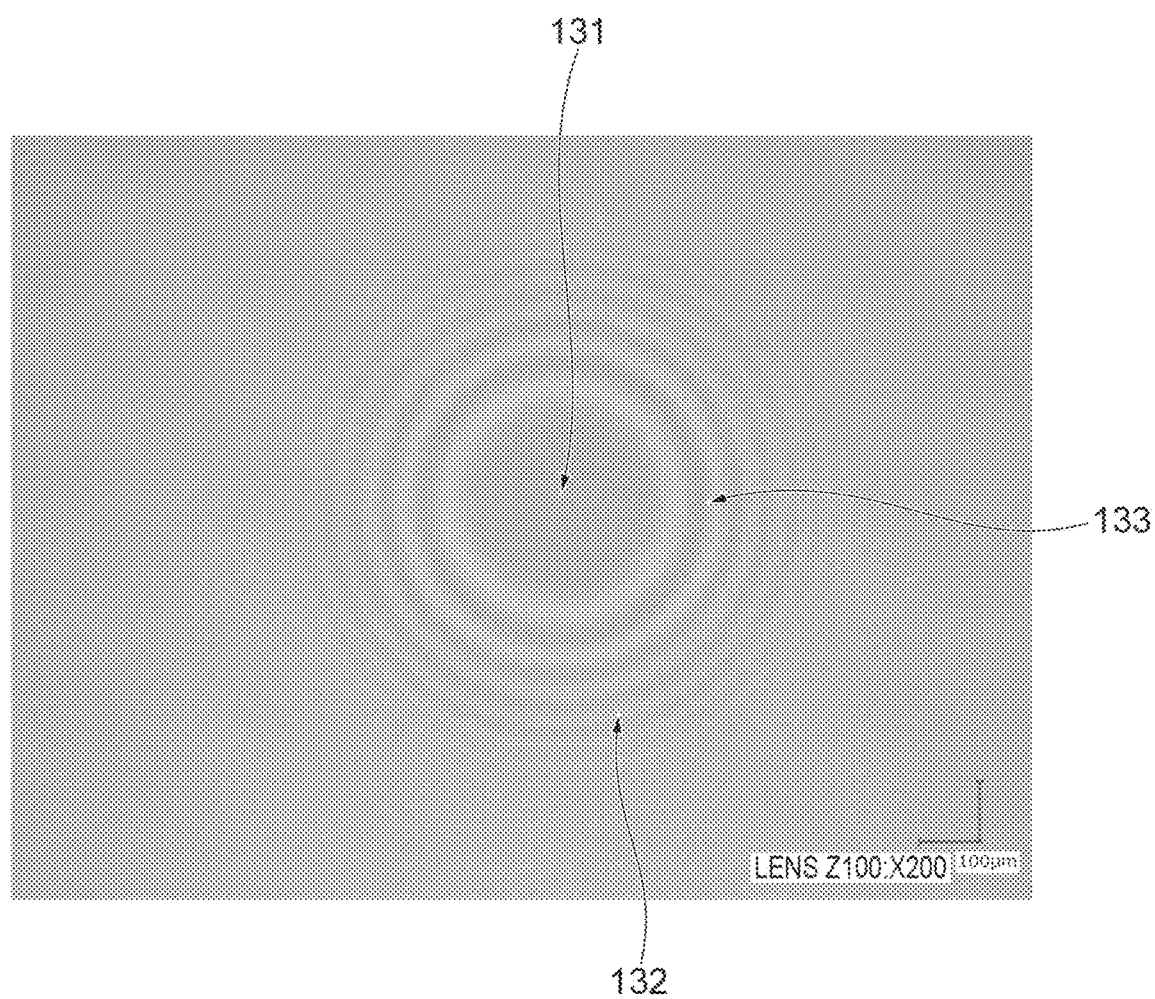

FIG. 9 is a photographic view illustrating the Newton ring observed in the saturable absorber of (a) of FIG. 8.

Figure 10:
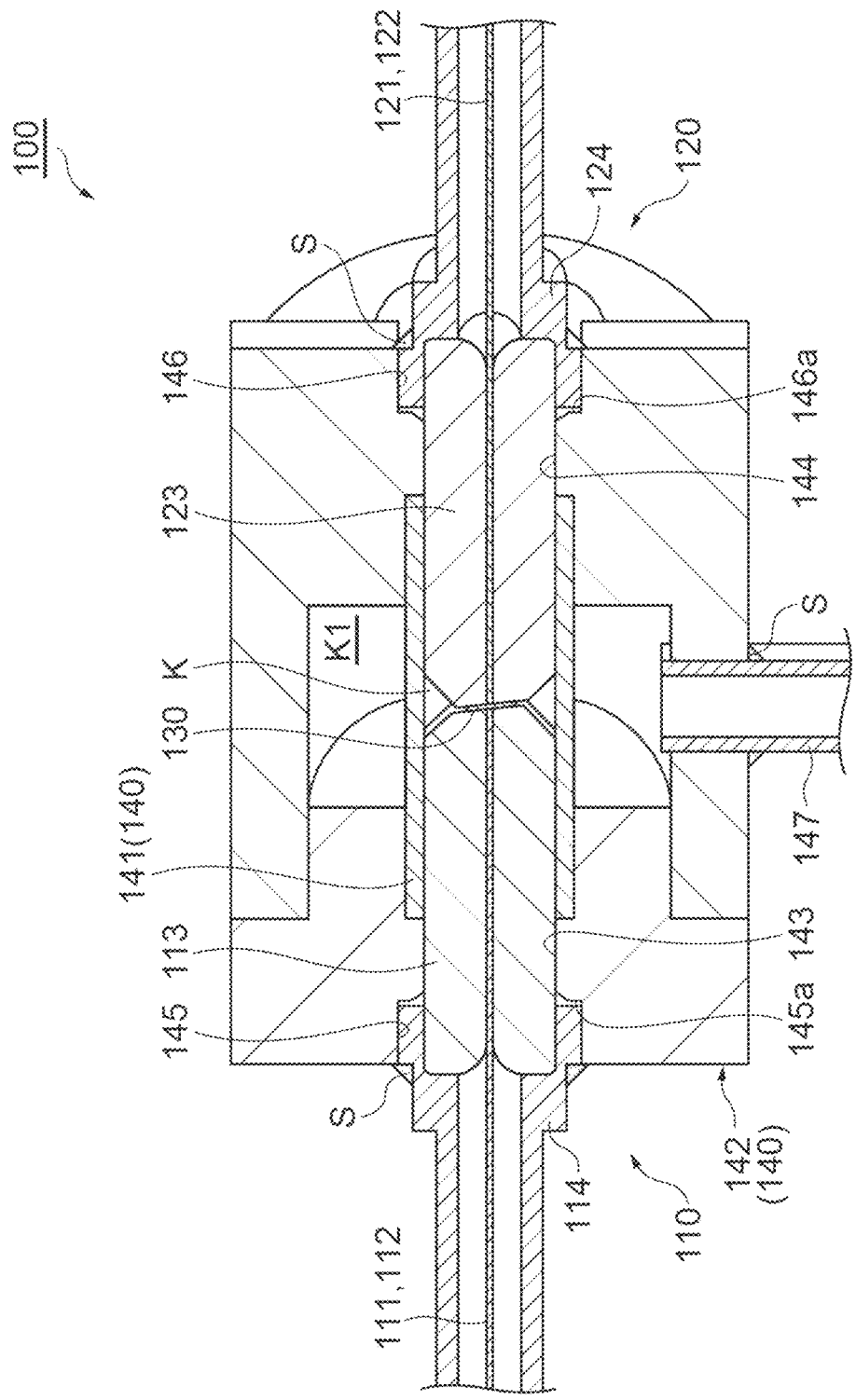

FIG. 10 is a diagram illustrating a continuation of (b) of FIG. 7.

Figure 11:
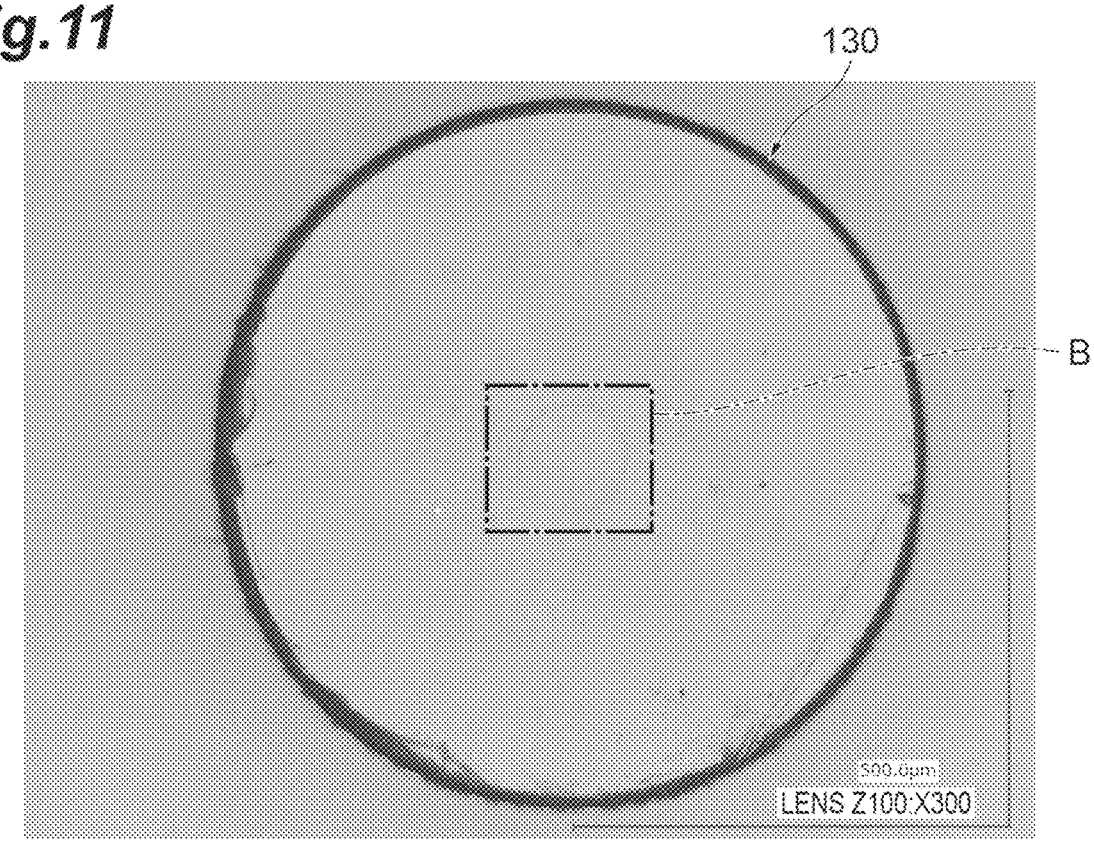
Figure 11:
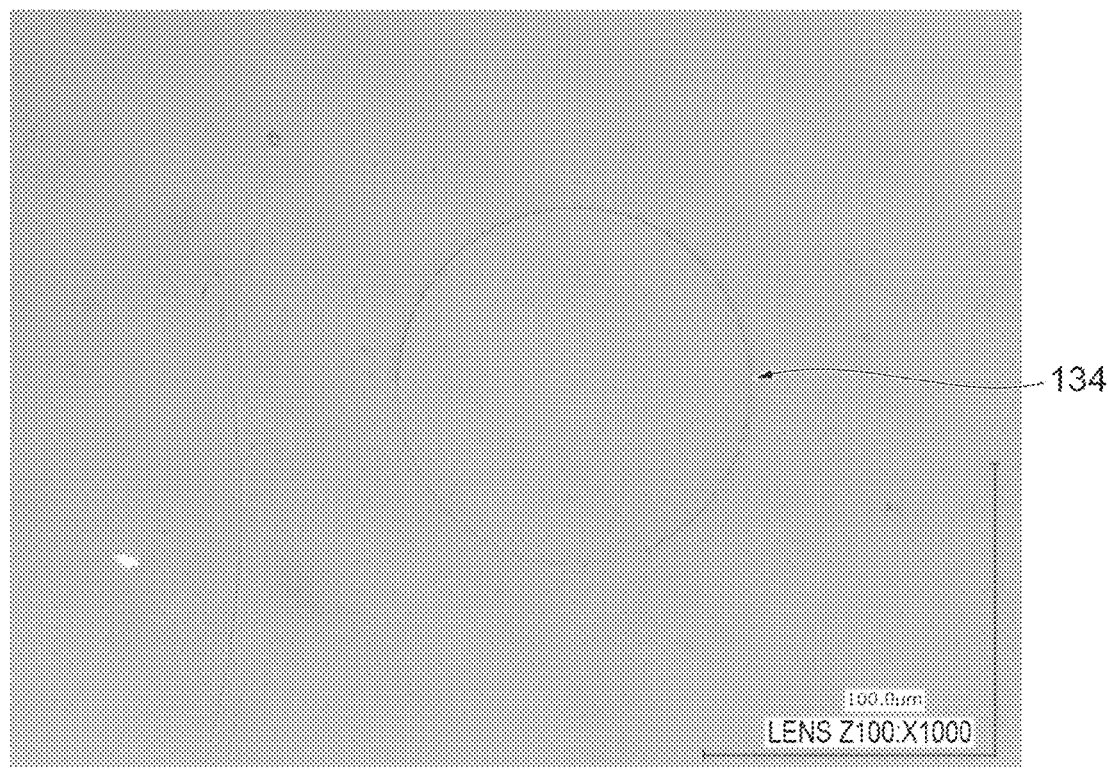

(a) of FIG. 11 is a photographic view illustrating a dent formed in a saturable absorber. (b) of FIG. 11 is an enlarged view of a part of (a) of FIG. 11.

Figure 12:
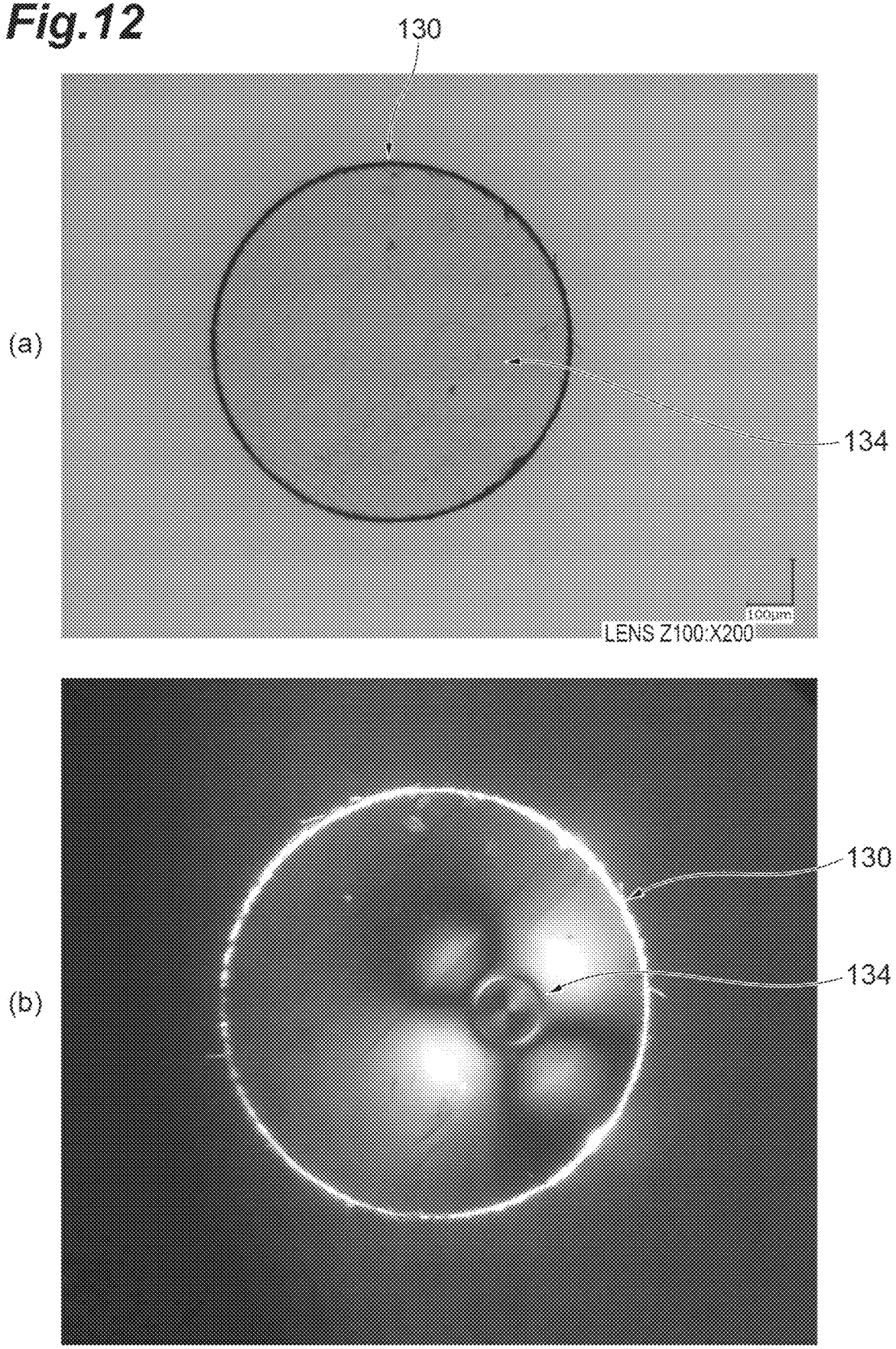

(a) of FIG. 12 is a photographic view illustrating a dent formed in a saturable absorber. (b) of FIG. 12 is a photographic view illustrating the result of observing the dent of (a) of FIG. 12 with a polarizing microscope.

Figure 13:
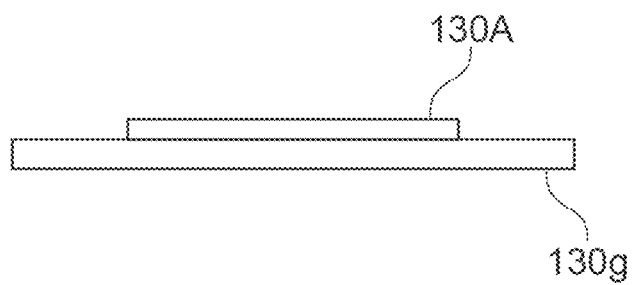

FIG. 13 is a side view schematically illustrating a state where a saturable absorber having a burr is placed on a glass plate.

Figure 14:
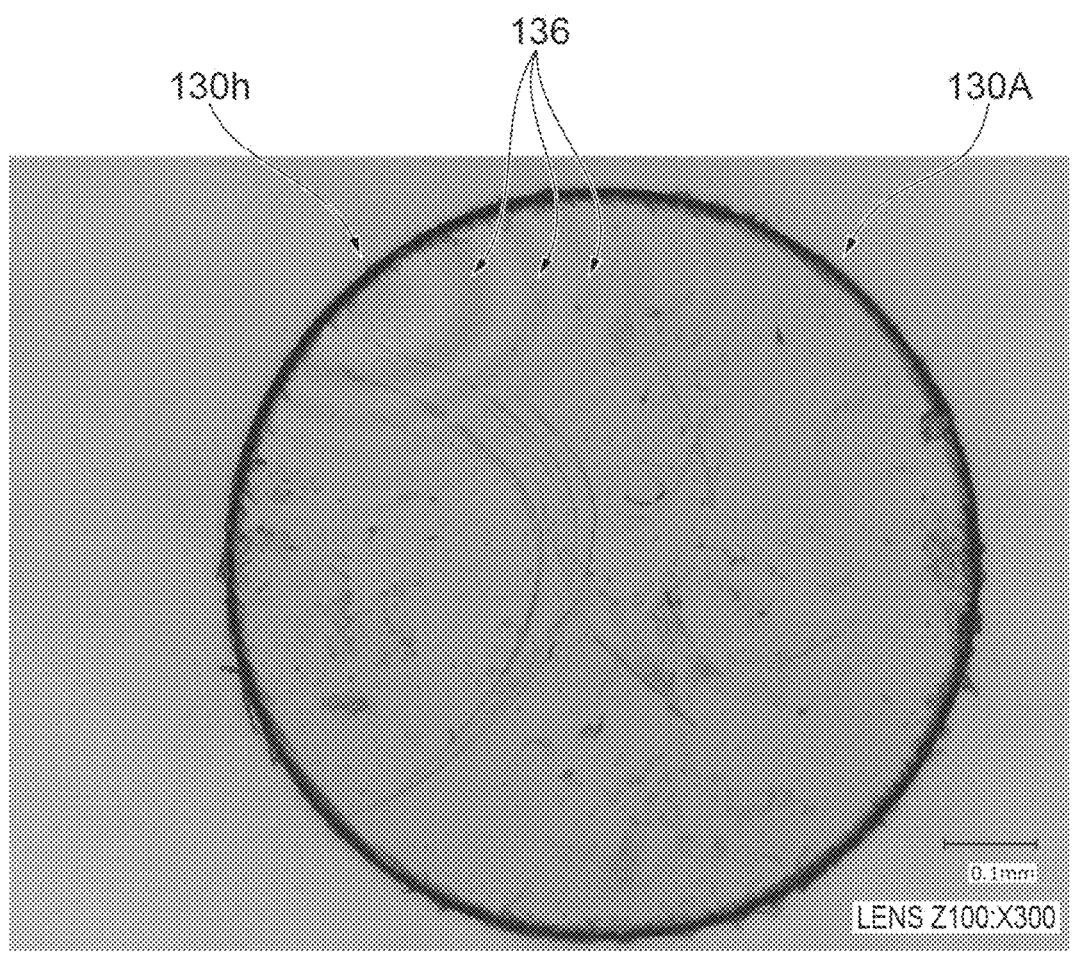

FIG. 14 is a photographic view illustrating the saturable absorber of FIG. 13.

Figure 15:
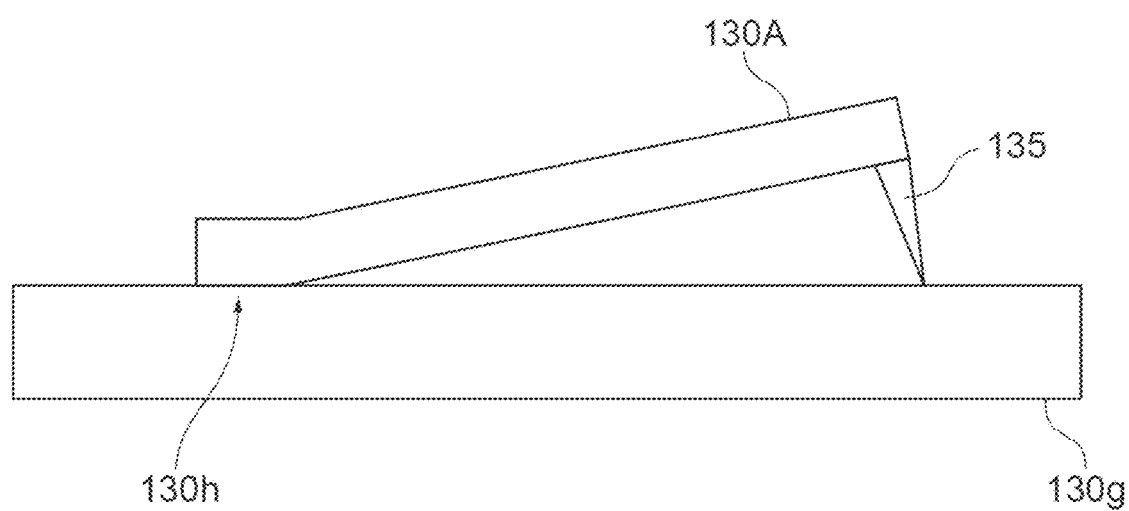

FIG. 15 is a diagram for describing the effect of the burr formed in the saturable absorber.

Figure 16:
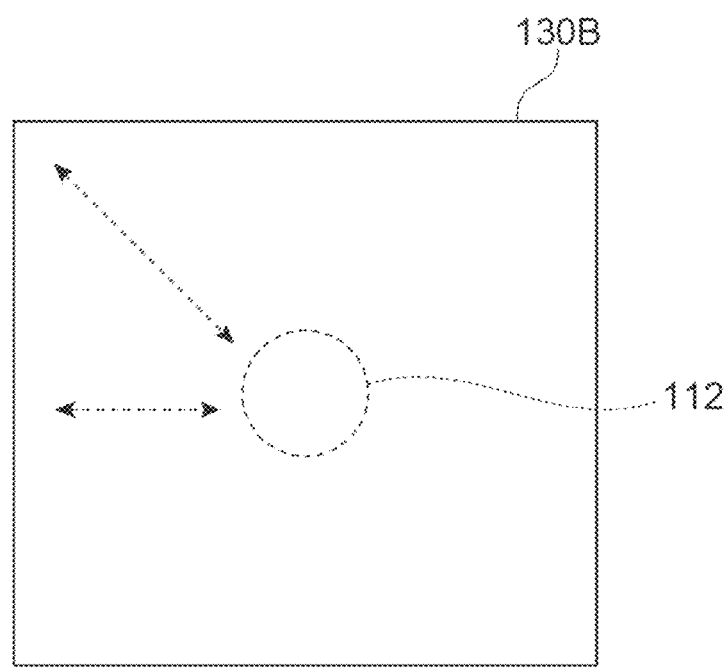
Figure 16:
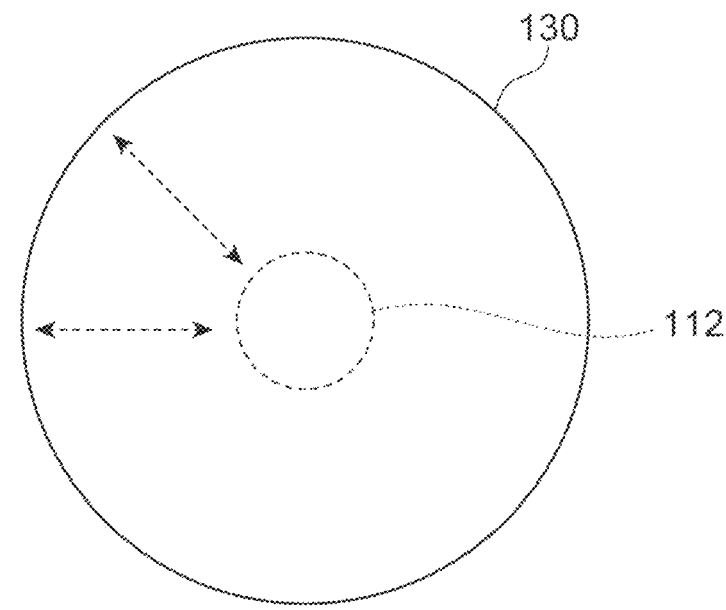

(a) of FIG. 16 is a diagram for describing the effect of the shape of the saturable absorber. (b) of FIG. 16 is another diagram for describing the effect of the shape of the saturable absorber.

Figure 17:
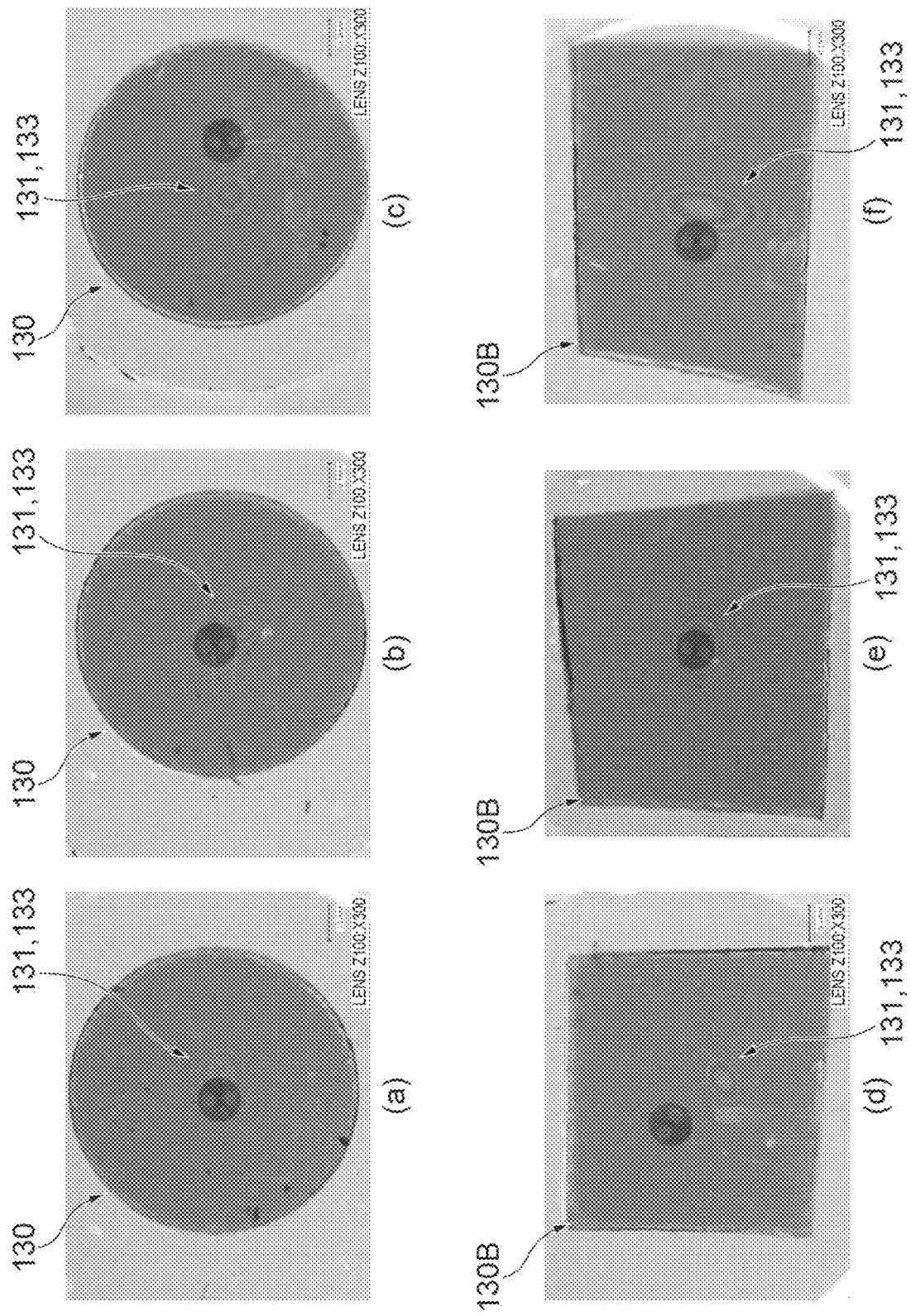

(a) of FIG. 17 is a photographic view illustrating a Newton ring in a case where a saturable absorber is circular. (b) of FIG. 17 is another photographic view illustrating the Newton ring in a case where the saturable absorber is circular. (c) of FIG. 17 is another photographic view illustrating the Newton ring in a case where the saturable absorber is circular. (d) of FIG. 17 is a photographic view illustrating a Newton ring in a case where a saturable absorber is quadrangular. (e) of FIG. 17 is another photographic view illustrating the Newton ring in a case where the saturable absorber is quadrangular. (f) of FIG. 17 is another photographic view illustrating the Newton ring in a case where the saturable absorber is quadrangular.

Figure 18:
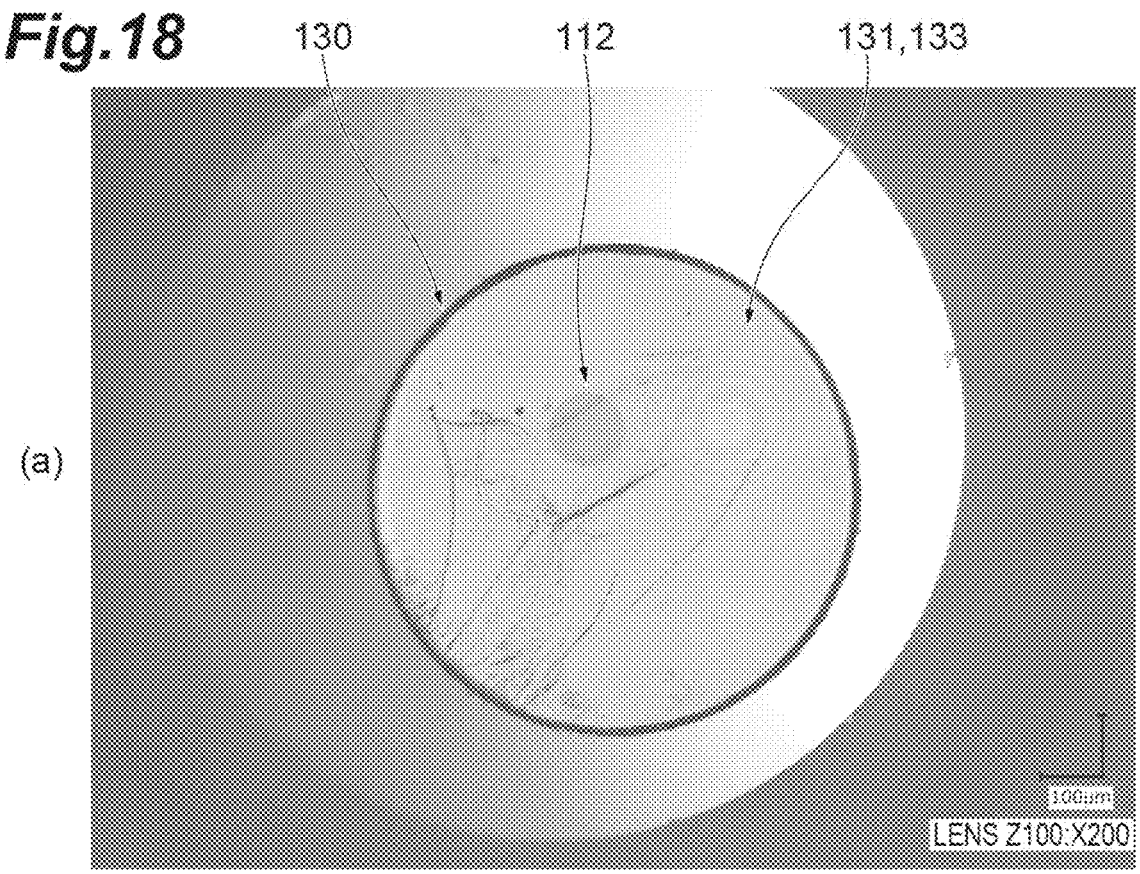
Figure 18:
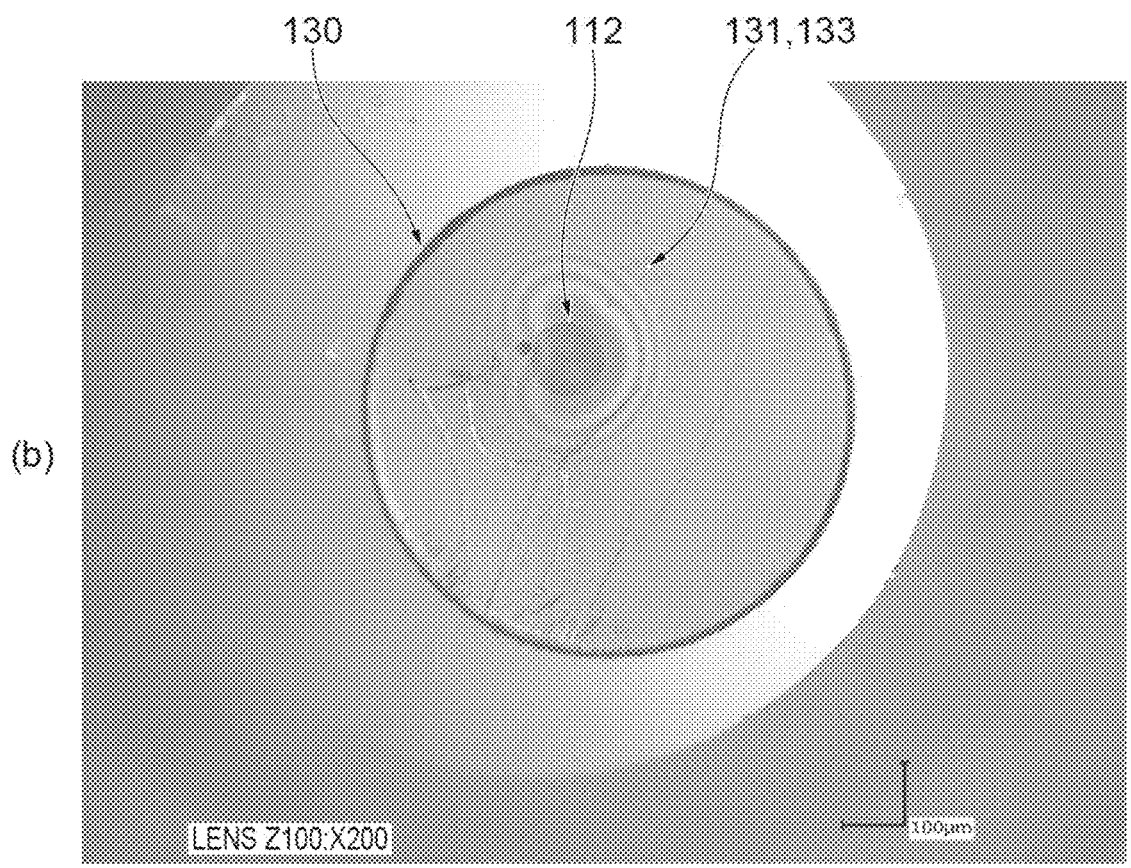

(a) of FIG. 18 is a photographic view illustrating the Newton ring observed in the saturable absorber. (b) of FIG. 18 is a photographic view illustrating the Newton ring observed in the saturable absorber.

DESCRIPTION OF EMBODIMENTS

Hereinafter, an embodiment will be described in detail with reference to the drawings. In the following description, the same or equivalent elements will be denoted by the same reference numerals with redundant description omitted.

Figure 1:
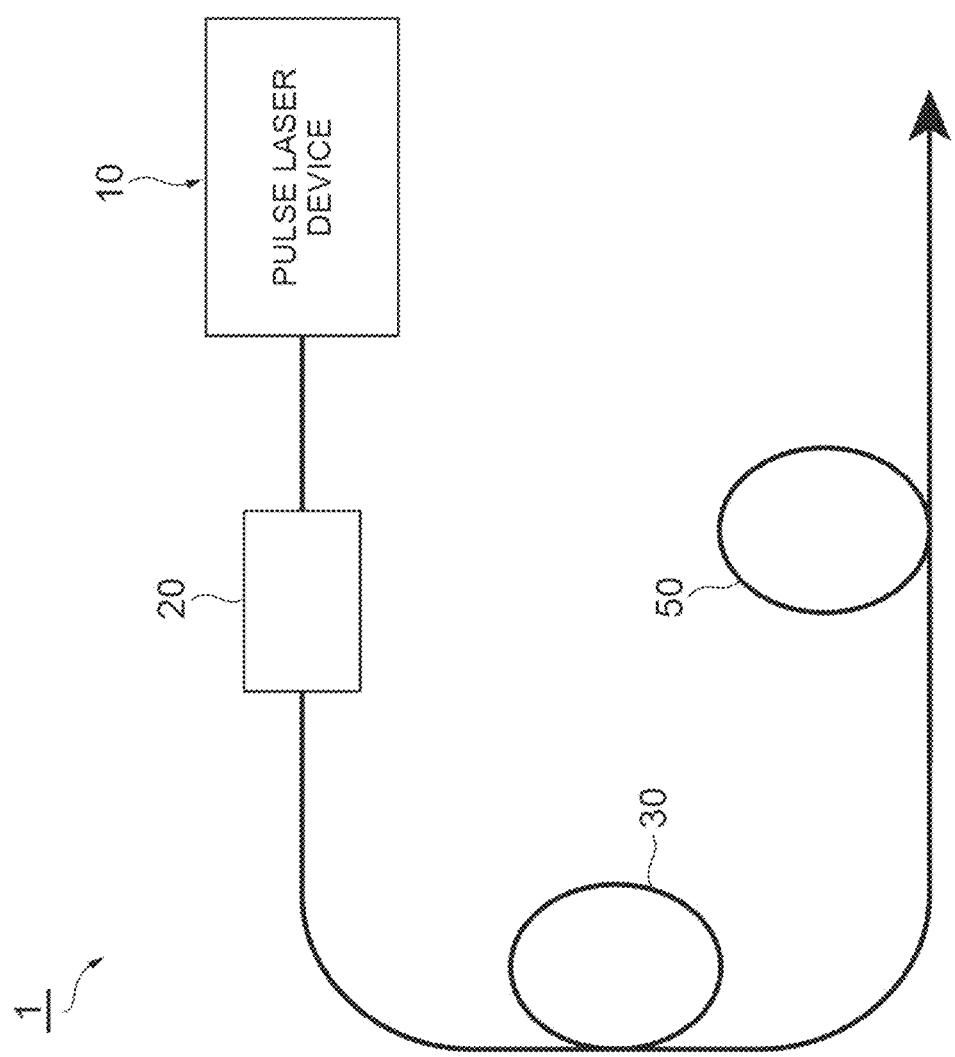
FIG. 1 is a schematic configuration diagram illustrating a supercontinuum light source according to an embodiment.

As illustrated in FIG. 1, a supercontinuum light source 1 is a light source generating supercontinuum light. The supercontinuum light source 1 includes a pulse laser device 10, a fiber amplifier 20, a pulse compression fiber 30, and a highly non-linear optical fiber 50.

The pulse laser device 10 is a ring-type laser oscillator. Details of the pulse laser device 10 will be described later. The output end of the pulse laser device 10 is connected to the fiber amplifier 20. The output end of the fiber amplifier 20 is connected to the pulse compression fiber 30. The output end of the pulse compression fiber 30 is connected to the highly non-linear optical fiber 50. The highly non-linear optical fiber 50 is a highly non-linear fiber generating supercontinuum light. The highly non-linear optical fiber 50 expands the spectral width of input pulsed light by the non-linear optical effect and converts it into supercontinuum light. The supercontinuum light is output from the output end of the highly non-linear optical fiber 50.

Figure 2:
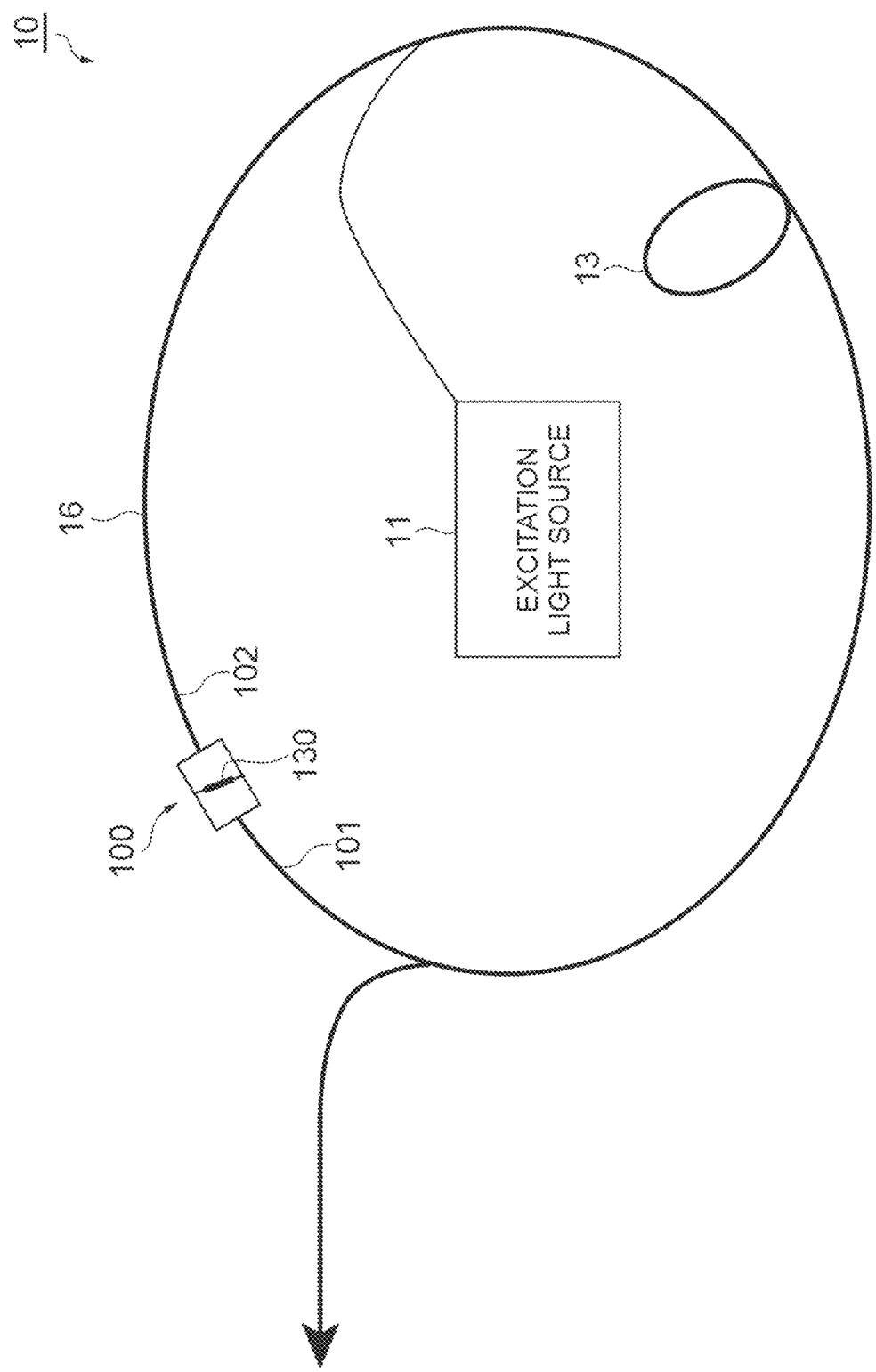
FIG. 2 is a schematic configuration diagram illustrating a pulse laser device of FIG. 1.

As illustrated in FIG. 2, the pulse laser device 10 constitutes an ultra-short pulse (femtosecond) laser device. The pulse laser device 10 includes an excitation light source 11, an amplification optical fiber 13, and a fiber structure 100. The excitation light source 11 where the fiber structure 100 is disposed on the optical path of an optical fiber 16 configured in a loop shape is, for example, a laser diode. Continuous light from the excitation light source 11 is input to the amplification optical fiber 13 and circulates in only one direction. The fiber structure 100 is a structure including a saturable absorber 130. Details of the fiber structure 100 will be described later.

The saturable absorber 130 is a material, and the light transparency of the material changes depending on the intensity of incident light. The saturable absorber 130 absorbs the incident light in a linear region where the incident light intensity is weak. When the incident light intensity reaches a high level, the absorption of the saturable absorber 130 decreases and the incident light is transmitted through the saturable absorber 130. In the pulse laser device 10, the amplitude of oscillating laser light fluctuates at a high frequency with time due to a noise component, and thus light with a high level of incident light intensity is transmitted without being absorbed by the saturable absorber 130 and becomes pulsed light. The pulsed light is superposed on continuous light circulating in a ring-type resonator, the intensity is increased by stimulated emission being promoted, and the transmission of the pulsed light through the saturable absorber 130 becomes more likely. While the pulsed light circulates in the ring-type resonator while growing in this manner, the saturable absorption characteristics of the saturable absorber 130, the fiber non-linear effect, and the wavelength dispersion effect result in pulsed light generation. The generated optical pulse is separated and output.

Next, the fiber structure 100 will be specifically described.

Figure 4:
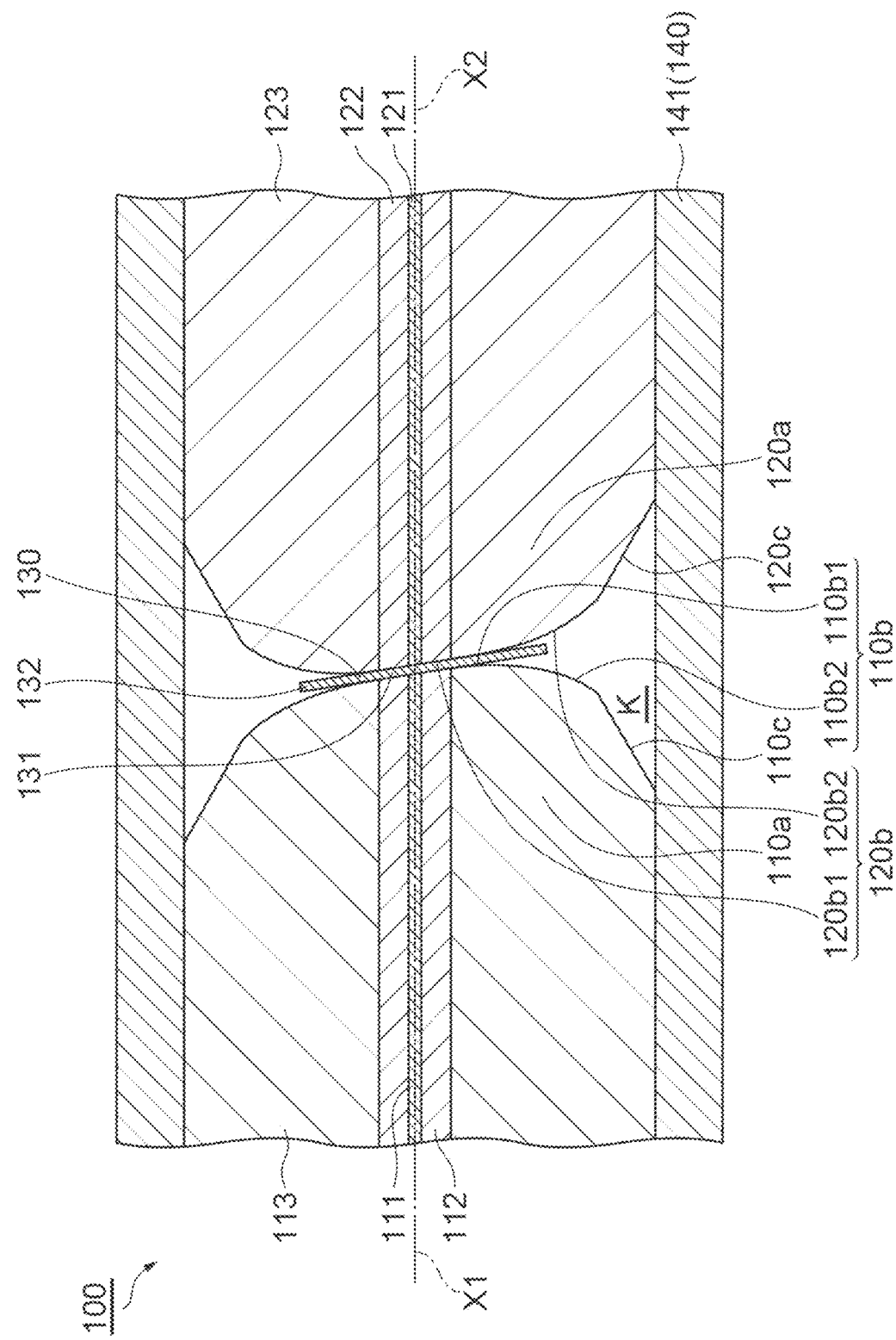
FIG. 4 is an enlarged vertical cross-sectional view illustrating a part of FIG. 3.

As illustrated in FIGS. 3 and 4, the fiber structure 100 includes a first optical fiber 110, a second optical fiber 120, the saturable absorber 130, and a housing 140. The first optical fiber 110 and the second optical fiber 120 are single-mode fibers. The first optical fiber 110 and the second optical fiber 120 are disposed such that a tip portion 110a of the first optical fiber 110 and a tip portion 120a of the second optical fiber 120 butt. The first optical fiber 110 and the second optical fiber 120 are disposed such that a first axis X1 of the first optical fiber 110 and a second axis X2 of the second optical fiber 120 coincide. A first end surface 110b of the first optical fiber 110 and a second end surface 120b of the second optical fiber 120 face each other.

The first optical fiber 110 has a first core 111, a first cladding 112, a first ferrule 113, and a first ferrule holding portion 114. The first core 111 extends along the first axis X1 of the first optical fiber 110. The first cladding 112 is provided around the first core 111. The first cladding 112 covers the periphery of the first core 111. The first cladding 112 extends along the first axis X1. The first ferrule 113 is a cylindrical body formed of ceramics. The tip sides of the first core 111 and the first cladding 112 are inserted in the first ferrule 113. The first ferrule 113 is provided around the first cladding 112 on the tip side of the first cladding 112. The first ferrule 113 covers the periphery of the tip side of the first cladding 112. The first ferrule 113 extends along the first axis X1. In this manner, the tip portion 110a of the first optical fiber 110 has the first core 111, the first cladding 112, and the first ferrule 113.

The tip portion 110a of the first optical fiber 110 has a protruding shape protruding to the tip side and has a function of preventing return light by being polished diagonally. The tip portion 110a having the protruding shape is formed so as to taper toward the tip side from the base end side of the first optical fiber 110. The outer diameter of the tip portion 110a having the protruding shape gradually decreases toward the tip side from the base end side of the first optical fiber 110. The tip surface of the first core 111, the tip surface of the first cladding 112, and the tip surface of the first ferrule 113 constitute the same first end surface 110b. The first end surface 110b is a bowl-shaped (spherical) curved surface. The first end surface 110b has a circular shape when viewed in the direction along the first axis X1 of the first optical fiber 110. The first ferrule 113 includes a first inclined surface 110c inclined in a direction away from the first axis X1 from the first end surface 110b toward the base end side of the first optical fiber 110. The first inclined surface 110c has, for example, the shape of a side surface of a truncated cone. In this manner, the surface of the tip portion 110a having the protruding shape includes the first end surface 110b and the first inclined surface 110c.

Likewise, the second optical fiber 120 has a second core 121, a second cladding 122, a second ferrule 123, and a second ferrule holding portion 124. The second core 121 extends along the second axis X2 of the second optical fiber 120. The second cladding 122 is provided around the second core 121. The second cladding 122 covers the periphery of the second core 121. The second cladding 122 extends along the second axis X2. The second ferrule 123 is a cylindrical body formed of ceramics. The tip sides of the second core 121 and the second cladding 122 are inserted in the second ferrule 123. The second ferrule 123 is provided around the second cladding 122 on the tip side of the second cladding 122. The second ferrule 123 covers the periphery of the tip side of the second cladding 122. The second ferrule 123 extends along the second axis X2. In this manner, the tip portion 120a of the second optical fiber 120 has the second core 121, the second cladding 122, and the second ferrule 123.

The tip portion 120a of the second optical fiber 120 has a protruding shape protruding to the tip side and has a function of preventing return light by being polished diagonally. The tip portion 120a having the protruding shape is formed so as to taper toward the tip side from the base end side of the second optical fiber 120. The outer diameter of the tip portion 120a having the protruding shape gradually decreases toward the tip side from the base end side of the second optical fiber 120. The tip surface of the second core 121, the tip surface of the second cladding 122, and the tip surface of the second ferrule 123 constitute the same second end surface 120b. The second end surface 120b is a bowl-shaped (spherical) curved surface. The second end surface 120b has a circular shape when viewed in the direction along the second axis X2 of the second optical fiber 120. The second ferrule 123 includes a second inclined surface 120c inclined in a direction away from the second axis X2 from the second end surface 120b toward the base end side of the second optical fiber 120. The second inclined surface 120c has, for example, the shape of a side surface of a truncated cone. In this manner, the surface of the tip portion 120a having the protruding shape includes the second end surface 120b and the second inclined surface 120c.

Figure 5:
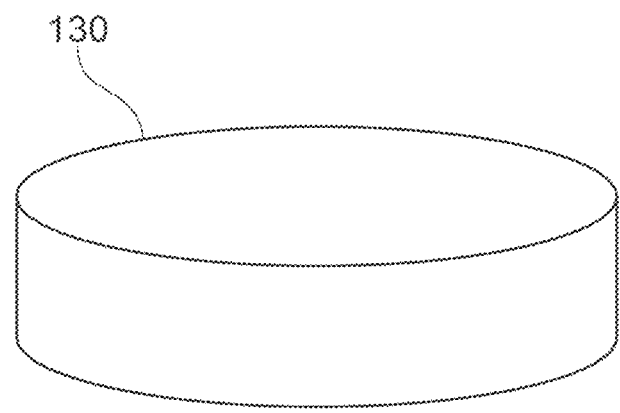
FIG. 5 is a perspective view illustrating a saturable absorber of FIG. 3.

The saturable absorber 130 is a material for ultra-short pulse laser device mode lock. As illustrated in FIG. 5, the saturable absorber 130 is a sheet-shaped sheet body containing carbon nanotubes. The saturable absorber 130 has, for example, a circular shape when viewed in the thickness direction of the saturable absorber 130 (hereinafter, also simply referred to as "thickness direction"). The diameter of the saturable absorber 130 is smaller than the diameters of the first ferrule 113 and the second ferrule 123. The diameter of the saturable absorber 130 is larger than the outer diameters of the first cladding 112 and the second cladding 122. The saturable absorber 130 is disposed between the tip portion 110a of the first optical fiber 110 and the tip portion 120a of the second optical fiber 120.

The saturable absorber 130 is provided so as to overlap the first core 111, the first cladding 112, and the first ferrule 113 when viewed in the thickness direction. The saturable absorber 130 is provided so as to include the first core 111, the first cladding 112, and the inner edge portion (tip surfaces) of the first ferrule 113 when viewed in the thickness direction. The outer edge of the saturable absorber 130 is positioned inside the outer edge of the first optical fiber 110 when viewed in the thickness direction. The outer edge of the saturable absorber 130 is positioned inside the outer edge of the first ferrule 113 when viewed in the thickness direction. The outer edge of the saturable absorber 130 is positioned inside the outer edge of the first end surface 110b and outside the outer edge of the first cladding 112 when viewed in the thickness direction.

Likewise, the saturable absorber 130 is provided so as to overlap the second core 121, the second cladding 122, and the second ferrule 123 when viewed in the thickness direction. The saturable absorber 130 is provided so as to include the second core 121, the second cladding 122, and the inner edge portion (tip surfaces) of the second ferrule 123 when viewed in the thickness direction. The outer edge of the saturable absorber 130 is positioned inside the outer edge of the second optical fiber 120 when viewed in the thickness direction. The outer edge of the saturable absorber 130 is positioned inside the outer edge of the second ferrule 123 when viewed in the thickness direction. The outer edge of the saturable absorber 130 is positioned inside the outer edge of the second end surface 120b and outside the outer edge of the second cladding 122 when viewed in the thickness direction.

The saturable absorber 130 is sandwiched between the tip portion 110a of the first optical fiber 110 and the tip portion 120a of the second optical fiber 120. Specifically, the saturable absorber 130 is sandwiched between the first end surface 110b and the second end surface 120b. The saturable absorber 130 includes an adhering part 131 adhering to the first end surface 110b and the second end surface 120b and a non-adhering part 132 not adhering to the first end surface 110b and the second end surface 120b. "Not adhering" includes being away (separated). "Not adhering" includes a gap (space) being present inbetween. The same applies to the following "not adhering". The adhering part 131 has a circular shape when viewed in the thickness direction. The non-adhering part 132 has a circular ring shape and is present around the adhering part 131 when viewed in the thickness direction.

The adhering part 131 adheres to a first region 110b1 of the first end surface 110b. The non-adhering part 132 does not adhere to a second region 110b2 of the first end surface 110b. The first region 110b1 has a circular shape when viewed in the direction along the first axis X1. The second region 110b2 has a circular ring shape and is present around the first region 110b1 when viewed in the direction along the first axis X1. The first region 110b1 includes the tip surface of the first core 111, the tip surface of the first cladding 112, and the inner edge portion of the tip surface of the first ferrule 113. The second region 110b2 includes the outer edge portion of the tip surface of the first ferrule 113. In other words, the adhering part 131 of the saturable absorber 130 adheres to the first core 111, the first cladding 112, and the inner edge portion of the first ferrule 113. The non-adhering part 132 of the saturable absorber 130 does not adhere to the outer edge portion of the first ferrule 113.

Likewise, the adhering part 131 adheres to a third region 120b1 of the second end surface 120b. The non-adhering part 132 does not adhere to a fourth region 120b2 of the second end surface 120b. The non-adhering part 132 is separated from the fourth region 120b2 of the second end surface 120b. The non-adhering part 132 is away from the fourth region 120b2 of the second end surface 120b. The third region 120b1 has a circular shape when viewed in the direction along the second axis X2. The fourth region 120b2 has a circular ring shape and is present around the third region 120b1 when viewed in the direction along the second axis X2. The third region 120b1 includes the tip surface of the second core 121, the tip surface of the second cladding 122, and the inner edge portion of the tip surface of the second ferrule 123. The fourth region 120b2 includes the outer edge portion of the tip surface of the second ferrule 123. In other words, the adhering part 131 of the saturable absorber 130 adheres to the second core 121, the second cladding 122, and the inner edge portion of the second ferrule 123. The non-adhering part 132 of the saturable absorber 130 does not adhere to the outer edge portion of the second ferrule 123.

It should be noted that the shapes of the adhering part 131, the non-adhering part 132, the first region 110b1, the second region 110b2, the third region 120b1, and the fourth region 120b2 are not particularly limited and shapes other than the shapes described above may be used depending on, for example, the mode of contact between the saturable absorber 130 and the first and second end surfaces 110b and 120b.

A dent (see FIGS. 11 and 12) corresponding to the shape of the first cladding 112 of the first optical fiber 110 adhering at the adhering part 131 is formed in the saturable absorber 130. The dent has a shape along the outer edge of the first cladding 112. Likewise, a dent corresponding to the shape of the second cladding 122 of the second optical fiber 120 adhering at the adhering part 131 is formed in the saturable absorber 130. The dent has a shape along the outer edge of the second cladding 122.

The saturable absorber 130 contains a sheet-shaped resin and the plurality of carbon nanotubes dispersed in the resin. A material having excellent heat resistance is used as the resin. The carbon nanotubes have the saturable absorption characteristics of absorbing light in the 1,560 nm band and the absorption decreasing when the incident light intensity reaches a high level.

The first optical fiber 110 and the second optical fiber 120 are fixed to the housing 140 in a state of being pressed in the direction of mutual approach. As a result, the tip portion 110a of the first optical fiber 110 and the tip portion 120a of the second optical fiber 120 are pressed in the direction of mutual approach. The saturable absorber 130 is sandwiched by and between the first end surface 110b and the second end surface 120b.

The first ferrule holding portion 114 and the second ferrule holding portion 124 have a circular tube shape. The first ferrule holding portion 114 holds the first ferrule 113. The first ferrule holding portion 114 is coaxially attached to the base end side of the first ferrule 113. The inner portion of the first ferrule holding portion 114 communicates with the inner portion of the first ferrule 113. The second ferrule holding portion 124 holds the second ferrule 123. The second ferrule holding portion 124 is coaxially attached to the base end side of the second ferrule 123. The inner portion of the second ferrule holding portion 124 communicates with the inner portion of the second ferrule 123.

The housing 140 has a sleeve 141 and a package 142. The sleeve 141 is a split sleeve having a C-shaped cross section. An axially extending slit is formed in the sleeve 141. The sleeve 141 has an elastic force tightening the end portions of the first optical fiber 110 and the second optical fiber 120 inserted therein. A space K in the sleeve 141 communicates with the outside of the sleeve 141 via the slit.

The package 142 has an elongated shape. The package 142 has a divided structure in which a plurality of members are fitted together. The fitting part is bonded with a sealing material such as an epoxy adhesive for vacuum airtightness. The package 142 is formed of stainless steel, aluminum, brass, or the like. A space K1 is formed in the package 142. The space K1 of the package 142 is in an airtight state. The space K1 is defined by the inner surface of the package 142 and the outer surface of the sleeve 141. The space K1 includes the space K in the sleeve 141. The space K1 communicates with the space K via the above-described slit of the sleeve 141. The space K1 contains the saturable absorber 130 in the package 142. The space K1 constitutes the surrounding space of the saturable absorber 130.

Through holes 143 and 144 communicating with the space K1 are formed along the longitudinal direction in the package 142. With the middle portion of the sleeve 141 positioned in the space K1, one end portion and the other end portion of the sleeve 141 are fitted in the through holes 143 and 144, respectively. The first ferrule 113 is inserted in the through hole 143. The second ferrule 123 is inserted in the through hole 144.

The through hole 143 has an end portion that includes an opening 145 increased in diameter via a step. The first ferrule holding portion 114 is inserted in the opening 145. With the first ferrule holding portion 114 inserted, a bottom surface 145a of the opening 145 is separated from the end surface of the first ferrule holding portion 114 (has a gap with respect to the end surface). The through hole 144 has an end portion that includes an opening 146 increased in diameter via a step. The second ferrule holding portion 124 is inserted in the opening 146. With the second ferrule holding portion 124 inserted, a bottom surface 146a of the opening 146 is separated from the end surface of the second ferrule holding portion 124 (has a gap with respect to the end surface).

A first tip tube 147 extending along a direction intersecting with the longitudinal direction is joined to the package 142. The first tip tube 147 communicates with the space K1. The first tip tube 147 is a glass or metal tube used when gas is discharged from the space K1 (the space K1 is vacuumized) and when the space K1 is filled with an inert gas or liquid. The first tip tube 147 is blocked such that the space K1 is in an airtight state.

The space between the package 142 and the first ferrule holding portion 114 (that is, between the package 142 and the first ferrule 113) is bonded and sealed by a sealing material S. The space between the package 142 and the second ferrule holding portion 124 (that is, between the package 142 and the second ferrule 123) is bonded and sealed by the sealing material S. The space between the package 142 and the first tip tube 147 is bonded and sealed by the sealing material S. The sealing material S is, for example, solder, a brazing material, or an epoxy adhesive for vacuum airtightness having a function as an adhesive. The space between the package 142 and the first ferrule holding portion 114, the space between the package 142 and the second ferrule holding portion 124, and the space between the package 142 and the first tip tube 147 may be bonded and sealed, for example, by welding.

Next, a method for producing the fiber structure 100 will be described.

First, a sheet-shaped sheet member (saturable absorption material) 130N (see FIG. 6), the first optical fiber 110, and the second optical fiber 120 are prepared (first step). The sheet member 130N is formed by dispersing a plurality of carbon nanotubes in a sheet-shaped resin. The sheet member 130N is prepared by a general known method. The sheet-shaped saturable absorber 130 is formed by punching the sheet member 130N (second step). Specifically, as illustrated in (a) of FIG. 6, the sheet member 130N is installed between, for example, a punch 130d of a hand punch 130c and a die 130e. As illustrated in (b) of FIG. 6, the sheet member 130N is cut and the saturable absorber 130 is formed by pressing the punch 130d toward the die 130e.

As illustrated in (c) of FIG. 6, the saturable absorber 130 is adsorbed by an adsorption instrument 130f (third step). Specifically, the adsorption instrument 130f adsorbs the surface of the saturable absorber 130 that is on the side opposite to the back surface pressed by the punch 130d.

As illustrated in (a) of FIG. 7, the saturable absorber 130 adsorbed by the adsorption instrument 130f is placed in the tip portion 110a of the first optical fiber 110 (fourth step). Specifically, the saturable absorber 130 is placed in the tip portion 110a of the first optical fiber 110 such that the back surface of the saturable absorber 130 abuts against the first end surface 110b of the first optical fiber 110. The saturable absorber 130 is placed so as to overlap the first core 111, the first cladding 112, and the first ferrule 113 when viewed in the thickness direction. The saturable absorber 130 is placed such that the outer edge is positioned inside the outer edge of the first optical fiber 110 when viewed in the thickness direction.

The saturable absorber 130 is placed such that the adhering part 131 adhering to the first core 111, the first cladding 112, and the inner edge portion of the first ferrule 113 and the non-adhering part 132 present around the adhering part 131 and not adhering to the outer edge portion of the first ferrule 113 are formed in the saturable absorber 130.

When the saturable absorber 130 is placed in the tip portion 110a of the first optical fiber 110, the saturable absorber 130 and the first end surface 110b adhere to each other as a result of the interaction between the interfaces caused by static electricity, intermolecular force, or the like. The adhesion force between the saturable absorber 130 and the first end surface 110b (that is, the degree of the interaction between the interfaces caused by the static electricity, intermolecular force, or the like) is larger than the weight of the saturable absorber 130 itself. Accordingly, when the saturable absorber 130 is placed on the first end surface 110b, the adhesion force makes it difficult for the saturable absorber 130 to fall from the first end surface 110b. As illustrated in (b) of FIG. 7, the first optical fiber 110 is inserted into the through hole 143 of the package 142 and the second optical fiber 120 is inserted into the through hole 144 of the package 142 in this state. At this time, the saturable absorber 130 is held on the first end surface 110b by the adhesion force, and thus the first optical fiber 110 can be inserted without the saturable absorber 130 falling from the first end surface 110b. Workability is improved as a result.

In the fourth step, a Newton ring containing interference fringes generated at the non-adhering part 132 of the saturable absorber 130 is formed in the saturable absorber 130. As illustrated in (a) of FIG. 8, after the saturable absorber 130 is placed (mounted) in the tip portion 110a of the first optical fiber 110, the Newton ring can be observed via the saturable absorber 130 in the direction along the first axis X1 by means of, for example, a microscope. As illustrated in (b) of FIG. 8, a Newton ring 133 is formed at the non-adhering part 132 of the saturable absorber 130, which is present around the adhering part 131 adhering to the first optical fiber 110. It should be noted that the illustration of the first optical fiber 110 is simplified in FIG. 8. FIG. 9 is a photographic view illustrating the Newton ring 133 observed in the saturable absorber 130. In FIG. 9, the middle black circular region is the adhering part 131 and the black annular ring outside the adhering part 131 is the Newton ring 133.

As illustrated in FIG. 10, the tip portion 110a of the first optical fiber 110 and the tip portion 120a of the second optical fiber 120 are caused to butt such that the saturable absorber 130 is sandwiched between the tip portion 110a of the first optical fiber 110 and the tip portion 120a of the second optical fiber 120 (fifth step).

In the fifth step, the saturable absorber 130 overlaps the second core 121, the second cladding 122, and the second ferrule 123 when viewed in the thickness direction. In the fifth step, the outer edge of the saturable absorber 130 is positioned inside the outer edge of the second optical fiber 120 when viewed in the thickness direction. In the fifth step, the adhering part 131 of the saturable absorber 130 adheres to the second core 121, the second cladding 122, and the inner edge portion of the second ferrule 123. In the fifth step, the non-adhering part 132 of the saturable absorber 130 does not adhere to the outer edge portion of the second ferrule 123.

In the fifth step, the dent (see FIGS. 11 and 12) corresponding to the shape of the first cladding 112 of the first optical fiber 110 adhering at the adhering part 131 is formed in the saturable absorber 130. Likewise, the dent corresponding to the shape of the second cladding 122 of the second optical fiber 120 adhering at the adhering part 131 is formed in the saturable absorber 130.

In the fifth step, the first optical fiber 110 and the second optical fiber 120 are pressed so as to approach each other. In this pressed state, the space between the package 142 and the first ferrule holding portion 114 is bonded and sealed by the sealing material S and the space between the package 142 and the second ferrule holding portion 124 is bonded and sealed by the sealing material S. As a result, the tip portion 110a of the first optical fiber 110 and the tip portion 120a of the second optical fiber 120 are accommodated in the housing 140 (sixth step). The first tip tube 147 is attached to an exhaust stand, and the space K1 is vacuumized via the first tip tube 147. Then, a part of the first tip tube 147 is removed and blocked.

As described above, in the fiber structure 100, the saturable absorber 130 sandwiched between the tip portion 110a of the first optical fiber 110 and the tip portion 120a of the second optical fiber 120 has the adhering part 131 adhering to the first core 111, the first cladding 112, and the inner edge portion of the first ferrule 113 of the first optical fiber 110 and the non-adhering part 132 present around the adhering part 131 and not adhering to the outer edge portion of the first ferrule 113 when viewed in the thickness direction. In other words, between the saturable absorber 130 (non-adhering part 132) and the tip portion 110a (second region 110b2) of the first optical fiber 110, a play part where these do not adhere is present. Accordingly, even if air bubbles are generated between the saturable absorber 130 and the tip portion 110a when, for example, the saturable absorber 130 is placed in the tip portion 110a of the first optical fiber 110, the air bubbles are capable of easily escaping to the surrounding space by means of the play part and it is possible to suppress the air bubbles having an effect to cause a decline in the adhesiveness between the saturable absorber 130 and the first optical fiber 110. In other words, the adhesiveness between the saturable absorber 130 and the first optical fiber 110 can be enhanced. When the adhesiveness between the saturable absorber 130 and the first optical fiber 110 is high, the heat conduction of the saturable absorber 130, eventually thermal diffusion, is improved, the life of the saturable absorber 130 can be extended, and durability enhancement can be achieved. When the adhesiveness between the saturable absorber 130 and the first optical fiber 110 is high, the saturable absorber 130 is unlikely to fall from the first optical fiber 110 when, for example, the abutment of the first optical fiber 110 and the second optical fiber 120 is released.

In the fiber structure 100, the adhering part 131 adheres to the first core 111 and the first cladding 112 of the first optical fiber 110. The tip portion 110a of the first optical fiber 110 and the tip portion 120a of the second optical fiber 120 butt such that the dent corresponding to the shape of the first cladding 112 of the first optical fiber 110 adhering at the adhering part 131 is formed in the saturable absorber 130. As a result, the saturable absorber 130 is sandwiched between the first optical fiber 110 and the second optical fiber 120 such that the dent is formed. In this case, the first optical fiber 110 and the second optical fiber 120 are capable of sandwiching the saturable absorber 130 with sufficient and appropriate force, the heat conduction of the saturable absorber 130, eventually thermal diffusion, is improved, the life of the saturable absorber 130 can be extended, and durability enhancement can be achieved.

In the fiber structure 100, the tip portion 120a of the second optical fiber 120 has a protruding shape protruding to the tip side. The adhering part 131 of the saturable absorber 130 adheres to the second core 121, the second cladding, and the inner edge portion of the second ferrule 123 of the second optical fiber 120. The non-adhering part 132 of the saturable absorber 130 does not adhere to the outer edge portion of the second ferrule 123. In other words, between the saturable absorber 130 (non-adhering part 132) and the outer edge portion (fourth region 120b2) of the second ferrule 123, a play part where these do not adhere is present. Accordingly, even if air bubbles are generated between, for example, the saturable absorber 130 and the second optical fiber 120, the air bubbles are capable of easily escaping to the surrounding space by means of the play part and it is possible to suppress the air bubbles having an effect to cause a decline in the adhesiveness between the saturable absorber 130 and the second optical fiber 120. In other words, the adhesiveness between the saturable absorber 130 and the second optical fiber 120 can be enhanced.

In the fiber structure 100, the adhering part 131 adheres to the second core 121 and the second cladding 122 of the second optical fiber 120. The tip portion 110a of the first optical fiber 110 and the tip portion 120a of the second optical fiber 120 butt such that the dent corresponding to the shape of the second cladding 122 of the second optical fiber 120 adhering at the adhering part 131 is formed in the saturable absorber 130. As a result, the saturable absorber 130 is sandwiched between the first optical fiber 110 and the second optical fiber 120 such that the dent is formed. In this case, the first optical fiber 110 and the second optical fiber 120 are capable of sandwiching the saturable absorber 130 with sufficient force, the heat conduction of the saturable absorber 130, eventually thermal diffusion, is improved, the life of the saturable absorber 130 can be extended, and durability enhancement can be achieved.

(a) of FIG. 11 is a photographic view illustrating a dent 134 formed in the saturable absorber 130. (b) of FIG. 11 is an enlarged view of the B portion of (a) of FIG. 11. As illustrated in (a) and (b) of FIG. 11, the dent 134 is formed in the saturable absorber 130 when the saturable absorber 130 is sandwiched between the first optical fiber 110 and the second optical fiber 120. The dent 134 is formed by leaving the shape of the outer edge of the first cladding 112 or the outer edge of the second cladding 122. By means of the dent 134 formed in the saturable absorber 130, it can be confirmed that the saturable absorber 130 appropriately overlapped the first core 111 and the first cladding 112 or the second core 121 and the second cladding 122. In addition, by means of the dent 134 formed in the saturable absorber 130, it can be confirmed that the first optical fiber 110 and the second optical fiber 120 sandwiched the saturable absorber 130 with appropriate force.

(a) of FIG. 12 is a photographic view illustrating the dent 134 formed in the saturable absorber 130. (b) of FIG. 12 is a photographic view illustrating the result of observing the dent 134 with a polarizing microscope. When the saturable absorber 130 is pressurized and stress is generated about the pressurized part in the saturable absorber 130, birefringence occurs at the pressurized part where the stress is generated when the saturable absorber 130 is irradiated with randomly polarized light. Accordingly, the pressurized part appears to shine when, for example, cross Nicol observation is performed by means of a polarizing microscope. Accordingly, the dent 134, which is a circular stress or cladding mark caused by sandwiching the saturable absorber 130 between the first optical fiber 110 and the second optical fiber 120, is brighter than, for example, parts other than the dent 134 as illustrated in (a) and (b) of FIG. 12 in, for example, cross Nicol observation by means of a polarizing microscope. In other words, it can be seen that the dent 134 in the saturable absorber 130 can be visualized by observing the saturable absorber 130 with a polarizing microscope.

In a punching-based saturable absorber formation process, a burr may be formed in the edge portion of the saturable absorber. As illustrated in FIG. 13, when a saturable absorber 130A formed by general punching is placed on a glass plate 130g and observed in the thickness direction of the saturable absorber 130A by means of, for example, a microscope, it can be seen that interference fringes 136 are formed at a part of the edge portion of the saturable absorber 130A as illustrated in FIG. 14. It is conceivable that this is because the saturable absorber 130A is lifted by a burr 135 formed in the edge portion of the saturable absorber 130A as illustrated in FIG. 15 and the lifting results in gap formation between the saturable absorber 130A and the glass plate 130g. It should be noted that the interference fringes are about a contact part 130h between the saturable absorber 130A and the glass plate 130g (see FIG. 14). When the burr 135 is formed in the edge portion of the saturable absorber 130A as described above, the gap formation between the saturable absorber 130A and the glass plate 130g may result in a decline in the adhesiveness between the saturable absorber 130A and the glass plate 130g.

In this regard, in the fiber structure 100, the play parts where these do not adhere are present between the saturable absorber 130 (non-adhering part 132) and the outer edge portion (second region 110b2) of the first ferrule 113 and between the saturable absorber 130 (non-adhering part 132) and the outer edge portion (fourth region 120b2) of the second ferrule 123 as described above. Accordingly, even if a burr is formed in, for example, the edge portion of the saturable absorber 130, it is possible to suppress a decline in the adhesiveness between the saturable absorber 130 and the first and second optical fibers 110 and 120 attributable to the burr. In other words, it is possible to enhance the adhesiveness between the saturable absorber 130 and the first and second optical fibers 110 and 120 by sufficiently using the interaction between the interfaces caused by, for example, static electricity, intermolecular force, or the like. In addition, the adhesiveness between the saturable absorber 130 and the first optical fiber 110 is enhanced even when the saturable absorber 130 is placed in the tip portion 110a of the first optical fiber 110, and thus falling of the saturable absorber 130 from the first optical fiber 110 is suppressed.

In the fiber structure 100, the outer edge of the saturable absorber 130 is positioned inside the outer edges of the first optical fiber 110 and the second optical fiber 120 when viewed in the thickness direction. The diameter of the saturable absorber 130 is smaller than the diameters of the first optical fiber 110 and the second optical fiber 120 as compared with a case where, for example, the outer edge of the saturable absorber is positioned outside the outer edges of the first optical fiber 110 and the second optical fiber 120 when viewed in the thickness direction, and thus no impact is likely to be applied from the sheet end portion of the saturable absorber 130. Accordingly, the adhesion force of the saturable absorber 130 with respect to the first optical fiber 110 and the second optical fiber 120 is improved and the saturable absorber 130 is unlikely to peel off. As a result, the adhesiveness between the saturable absorber 130 and the first and second optical fibers 110 and 120 can be further enhanced.

In the fiber structure 100, the saturable absorber 130 has a circular shape when viewed in the thickness direction. When the saturable absorber has, for example, a polygonal shape when viewed in the thickness direction, the saturable absorber is likely to peel off from its corner portion. On the other hand, the saturable absorber 130 has a circular shape when viewed in the thickness direction, and thus the saturable absorber 130 is unlikely to peel off from the first optical fiber 110 and the second optical fiber 120. As a result, the adhesiveness between the saturable absorber 130 and the first and second optical fibers 110 and 120 can be further enhanced.

In the fiber structure 100, the saturable absorber 130 contains the sheet-shaped resin and the plurality of carbon nanotubes dispersed in the resin. As a result, the saturable absorber 130 can be formed from the resin and the carbon nanotubes.

The pulse laser device 10 includes the fiber structure 100. The pulse laser device 10 as well as the fiber structure 100 has actions and effects such as being capable of enhancing the adhesiveness between the saturable absorber 130 and the first optical fiber 110.

The supercontinuum light source 1 includes the pulse laser device 10. The supercontinuum light source 1 as well as the fiber structure 100 has actions and effects such as being capable of enhancing the adhesiveness between the saturable absorber 130 and the first optical fiber 110.

When the first optical fiber 110 is pressed to the second optical fiber 120 side, it is difficult to further press the first optical fiber 110 if the first optical fiber 110 and the package 142 are already in contact (mechanical interference). In other words, a gap between the package 142 and the first optical fiber 110 (or the first ferrule holding portion 114) is necessary in order to realize the pressing. The same applies to the second optical fiber 120.

In this regard, in the fiber structure 100, a gap is formed between the package 142 (bottom surface 145a of the opening 145) and the end surface of the first ferrule holding portion 114. A gap is formed between the package 142 (bottom surface 146a of the opening 146) and the end surface of the second ferrule holding portion 124. As a result, the first optical fiber 110 and the second optical fiber 120 can be pressed against each other.

In the fourth step of the method for producing the fiber structure 100, the saturable absorber 130 is placed in the tip portion 110a of the first optical fiber 110 such that the adhering part 131 adhering to the first core 111, the first cladding 112, and the inner edge portion of the first ferrule 113 of the first optical fiber 110 and the non-adhering part 132 present around the adhering part 131 and not adhering to the outer edge portion of the first ferrule 113 are formed in the saturable absorber 130. In other words, between the saturable absorber 130 (non-adhering part 132) and the outer edge portion (second region 110b2) of the first ferrule 113, the play part where these do not adhere is present. Accordingly, even if air bubbles are generated between the saturable absorber 130 and the tip portion 110a when, for example, the saturable absorber 130 is placed in the tip portion 110a of the first optical fiber 110, the air bubbles are capable of easily escaping to the surrounding space by means of the play part and it is possible to suppress the air bubbles having an effect to cause a decline in the adhesiveness between the saturable absorber 130 and the first optical fiber 110. In other words, the adhesiveness between the saturable absorber 130 and the first optical fiber 110 can be enhanced. When the adhesiveness between the saturable absorber 130 and the first optical fiber 110 is high, the heat conduction of the saturable absorber 130, eventually thermal diffusion, is improved, the life of the saturable absorber 130 can be extended, and durability enhancement can be achieved. When the adhesiveness between the saturable absorber 130 and the first optical fiber 110 is high, the saturable absorber 130 is unlikely to fall from the first optical fiber 110.

In the fourth step of the method for producing the fiber structure 100, the saturable absorber 130 is placed in the tip portion of the first optical fiber 110 such that the adhering part 131 adheres to the first core 111 and the first cladding 112 of the first optical fiber 110. In the fifth step, the tip portion 110a of the first optical fiber 110 and the tip portion 120a of the second optical fiber 120 butt such that the dent corresponding to the shape of the first cladding 112 of the first optical fiber 110 adhering at the adhering part 131 is formed in the saturable absorber 130. As a result, the saturable absorber 130 is sandwiched between the first optical fiber 110 and the second optical fiber 120 such that the dent is formed. In this case, the first optical fiber 110 and the second optical fiber 120 are capable of sandwiching the saturable absorber 130 with sufficient force, the heat conduction of the saturable absorber 130, eventually thermal diffusion, is improved, the life of the saturable absorber 130 can be extended, and durability enhancement can be achieved.

In the method for producing the fiber structure 100, the tip portion 120a of the second optical fiber 120 has a protruding shape protruding to the tip side. In the fifth step, the tip portion 110a of the first optical fiber 110 and the tip portion 120a of the second optical fiber 120 butt such that the adhering part 131 adheres to the second core 121, the second cladding 122, and the inner edge portion of the second ferrule 123 of the second optical fiber 120 and the non-adhering part 132 does not adhere to the outer edge portion of the second ferrule 123. In other words, between the saturable absorber 130 (non-adhering part 132) and the outer edge portion (fourth region 120b2) of the second ferrule 123, the play part where these do not adhere is present. Accordingly, even if air bubbles are generated between, for example, the saturable absorber 130 and the second optical fiber 120 with the tip portion 110a of the first optical fiber 110 and the tip portion 120a of the second optical fiber 120 butting, the air bubbles are capable of easily escaping to the surrounding space by means of the play part and it is possible to suppress the air bubbles having an effect to cause a decline in the adhesiveness between the saturable absorber 130 and the second optical fiber 120. In other words, the adhesiveness between the saturable absorber 130 and the second optical fiber 120 can be enhanced.

In the fifth step of the method for producing the fiber structure 100, the tip portion 110a of the first optical fiber 110 and the tip portion 120a of the second optical fiber 120 butt such that the dent corresponding to the shape of the second cladding 122 of the second optical fiber 120 adhering at the adhering part 131 is formed in the saturable absorber 130. As a result, the saturable absorber 130 is sandwiched between the first optical fiber 110 and the second optical fiber 120 such that the dent is formed. In this case, the first optical fiber 110 and the second optical fiber 120 are capable of sandwiching the saturable absorber 130 with sufficient force, the heat conduction of the saturable absorber 130, eventually thermal diffusion, is improved, the life of the saturable absorber 130 can be extended, and durability enhancement can be achieved.

In the fourth step of the method for producing the fiber structure 100, the saturable absorber 130 is placed in the tip portion 110a of the first optical fiber 110 such that the outer edge is positioned inside the outer edge of the first optical fiber 110 when viewed in the thickness direction. As compared with, for example, a case where the saturable absorber is placed in the tip portion 110a of the first optical fiber 110 such that the outer edge is positioned outside the outer edge of the first optical fiber 110 when viewed in the thickness direction, the diameter of the saturable absorber 130 is smaller than the diameter of the first optical fiber 110, and thus no impact is likely to be applied from the sheet end portion of the saturable absorber 130. Accordingly, the adhesion force of the saturable absorber 130 with respect to the first optical fiber 110 is improved and the saturable absorber 130 is unlikely to peel off. As a result, the adhesiveness between the saturable absorber 130 and the first optical fiber 110 can be further enhanced.

In the fifth step of the method for producing the fiber structure 100, the tip portion 110a of the first optical fiber 110 and the tip portion 120a of the second optical fiber 120 butt such that the outer edge of the saturable absorber 130 is positioned inside the outer edge of the second optical fiber 120 when viewed in the thickness direction. As compared with, for example, a case where the tip portion 110a of the first optical fiber 110 and the tip portion 120a of the second optical fiber 120 butt such that the outer edge of the saturable absorber is positioned outside the outer edge of the second optical fiber 120 when viewed in the thickness direction, the diameter of the saturable absorber 130 is smaller than the diameter of the second optical fiber 120, and thus no impact is likely to be applied from the sheet end portion of the saturable absorber 130. Accordingly, the adhesion force of the saturable absorber 130 with respect to the second optical fiber 120 is improved and the saturable absorber 130 is unlikely to peel off. As a result, the adhesiveness between the saturable absorber 130 and the second optical fiber 120 can be further enhanced.

In the fourth step of the method for producing the fiber structure 100, the Newton ring 133 containing the interference fringes generated at the non-adhering part 132 of the saturable absorber 130 is formed in the saturable absorber 130. Accordingly, by observing the Newton ring 133, it is possible to easily grasp the state where the adhering part 131 of the saturable absorber 130 adheres to the first core 111, the first cladding 112, and the inner edge portion of the first ferrule 113 and the non-adhering part 132 of the saturable absorber 130 does not adhere to the outer edge portion of the first ferrule 113.

The method for producing the fiber structure 100 includes the sixth step of accommodating the tip portion 110a of the first optical fiber 110 and the tip portion 120a of the second optical fiber 120 in the housing 140. Accordingly, the saturable absorber 130 can be accommodated in the housing 140 together with the tip portion 110a of the first optical fiber 110 and the tip portion 120a of the second optical fiber 120. As a result, deterioration of the saturable absorber 130 attributable to oxidation can be suppressed. Accordingly, the life of the saturable absorber 130 can be extended and durability enhancement can be achieved.

In the method for producing the fiber structure 100, the saturable absorber 130 is circular when viewed in the thickness direction. As a result, the adhesiveness between the saturable absorber 130 and the first and second optical fibers 110 and 120 can be further enhanced as described above.

It should be noted that the above effect in the case of burr formation in the edge portion of the saturable absorber 130 is similarly exhibited in the method for producing the fiber structure 100.

As illustrated in (a) and (b) of FIG. 16, in the saturable absorber 130, the distance from the center to the edge portion is more uniform than in a polygonal saturable absorber 130B. As a result, the center of the saturable absorber 130 can be more easily aligned with the center of the tip portion 110a of the first optical fiber 110 (here, the center of the first cladding 112). In other words, the saturable absorber 130 can be easily placed in the tip portion 110a of the first optical fiber 110. As a result, in the fiber structure 100, the saturable absorber 130 and the first optical fiber 110 can be accurately positioned relative to each other.

In the circular saturable absorber 130 as compared with the polygonal saturable absorber 130B, the size (area) of the saturable absorber 130 can be reduced with the area of the adhering part 131 with respect to the first optical fiber 110 constant. As a result, the center of the saturable absorber 130 can be more easily aligned with the center of the tip portion 110a of the first optical fiber 110. In other words, the saturable absorber 130 can be more easily placed in the tip portion 110a of the first optical fiber 110. As a result, in the fiber structure 100, the saturable absorber 130 and the first optical fiber 110 can be more accurately positioned relative to each other. In addition, when the saturable absorber 130 is placed in the tip portion 110a of the first optical fiber 110, there is no need to pay attention to the corner portion protruding from the first ferrule 113, and thus workability is improved.

(a) to (f) of FIG. 17 are photographic views illustrating the Newton ring. As illustrated in (a) to (f) of FIG. 17, the size of the adhering part 131 with respect to the first optical fiber 110 in each of the saturable absorbers 130 and 130B can be observed by observing the Newton ring 133. When the saturable absorber 130 is used, the diameter of the adhering part 131 is approximately 66.7 μm to 110 μm. The diameter of the adhering part 131 is approximately 90 μm when the saturable absorber 130B is used. As described above, the size of the adhering part 131 does not tend to change depending on the shape of the saturable absorber. The adhesion ratio between the saturable absorber 130 and the first optical fiber 110 (area of the adhering part 131/area of the saturable absorber 130) is approximately 0.5% to 2.0%.

By the way, when the saturable absorber 130 is placed in the tip portion 110a of the first optical fiber 110, the size of the adhering part 131 between the saturable absorber 130 and the tip portion 110a depends only on the radius of curvature of the first end surface 110b without depending on the parameters of the saturable absorber 130 (when the saturable absorber 130 maintains a flat sheet shape). This is because the adhering part 131 is a point-of-contact component between the first end surface 110b of the first optical fiber 110 and the saturable absorber 130.

FIG. 18 is a photographic view illustrating the Newton ring observed in the saturable absorber 130. After the saturable absorber 130 is placed in the tip portion 110a of the first optical fiber 110, the adhering part 131 may move before and after the saturable absorber 130 is sandwiched between the first optical fiber 110 and the second optical fiber 120. After the placement of the saturable absorber 130 in the tip portion 110a of the first optical fiber 110, the Newton ring 133 was observed before the sandwiching of the saturable absorber 130 between the first optical fiber 110 and the second optical fiber 120. Then, the saturable absorber 130 was sandwiched between the first optical fiber 110 and the second optical fiber 120, the first optical fiber 110 and the saturable absorber 130 were removed from the second optical fiber 120 after, for example, 40 hours, and the Newton ring 133 was observed again.

As illustrated in (a) of FIG. 18, the Newton ring 133 is formed at a position away from the first cladding 112 after the saturable absorber 130 is placed in the tip portion 110a of the first optical fiber 110 and before the saturable absorber 130 is sandwiched between the first optical fiber 110 and the second optical fiber 120. On the other hand, as illustrated in (b) of FIG. 18, the Newton ring 133 moves in the direction of the first cladding 112 after the saturable absorber 130 is sandwiched between the first optical fiber 110 and the second optical fiber 120 and then the first optical fiber 110 and the saturable absorber 130 are removed from the second optical fiber 120.

As described above, one aspect of the present invention is not limited to the above-described embodiment and may be modified or applied to those that differ without changing the gist described in each claim.

Although an example in which the first inclined surface 110c of the first optical fiber 110 is a side surface of a truncated cone is illustrated in the above embodiment, the first inclined surface 110c may be a curved surface continuously connected to the first end surface 110b. In other words, the tip-side end surface of the first optical fiber 110 may be a bowl-shaped (spherical) curved surface protruding to the tip side. In the above embodiment, the tip-side end surface of the first optical fiber 110 may be configured by a flat surface and a curved surface.

Although an example in which the second inclined surface 120c of the second optical fiber 120 is a side surface of a truncated cone is illustrated in the above embodiment, the second inclined surface 120c may be a curved surface continuously connected to the second end surface 120b. In other words, the tip-side end surface of the second optical fiber 120 may be a bowl-shaped (spherical) curved surface protruding to the tip side. In the above embodiment, the tip-side end surface of the second optical fiber 120 may be configured by a flat surface and a curved surface.

Although an example in which both the tip portion 110a of the first optical fiber 110 and the tip portion 120a of the second optical fiber 120 have a protruding shape protruding to the tip side is illustrated in the above embodiment, the tip portion 120a of the second optical fiber 120 may not have a protruding shape. For example, the tip portion 120a of the second optical fiber 120 may have a columnar shape and the outer diameter of the tip portion 120a of the second optical fiber 120 may match the outer diameter of the base end side of the second optical fiber 120.

Although an example in which the adhering part 131 of the saturable absorber 130 adheres to the first core 111, the first cladding 112, and the inner edge portion of the first ferrule 113 of the first optical fiber 110 is illustrated in the above embodiment, the adhering part 131 may not adhere to the first cladding 112 and the inner edge portion of the first ferrule 113. The adhering part 131 may at least adhere to the first core 111.

Although an example in which the adhering part 131 of the saturable absorber 130 adheres to the second core 121, the second cladding 122, and the inner edge portion of the second ferrule 123 of the second optical fiber 120 is illustrated in the above embodiment, the adhering part 131 may not adhere to the second cladding 122 and the inner edge portion of the second ferrule 123. The adhering part 131 may at least adhere to the second core 121.

Although an example in which the outer edge of the saturable absorber 130 is positioned inside the outer edges of both the first optical fiber 110 and the second optical fiber 120 when viewed in the thickness direction is illustrated in the above embodiment, the outer edge of the saturable absorber 130 may not be positioned inside the outer edge of the second optical fiber 120 insofar as the outer edge of the saturable absorber 130 is positioned inside the outer edge of the first optical fiber 110 when viewed in the thickness direction. For example, when viewed in the thickness direction, the outer edge of the saturable absorber 130 may coincide with the outer edge of the second optical fiber 120 or may be positioned outside the outer edge of the second optical fiber 120. The outer edge of the saturable absorber 130 may not be positioned inside the outer edge of the first optical fiber 110 insofar as the outer edge of the saturable absorber 130 is positioned inside the outer edge of the second optical fiber 120 when viewed in the thickness direction. For example, when viewed in the thickness direction, the outer edge of the saturable absorber 130 may coincide with the outer edge of the first optical fiber 110 or may be positioned outside the outer edge of the first optical fiber 110. The outer edge of the saturable absorber 130 may be positioned inside the outer edge of at least one of the first optical fiber 110 and the second optical fiber 120 when viewed in the thickness direction.

Although an example in which the tip portion 110a of the first optical fiber 110 and the tip portion 120a of the second optical fiber 120 have a protruding shape and the saturable absorber 130 is provided with a configuration having the adhering part 131 and the non-adhering part 132 is described in the above embodiment, the present invention is not limited thereto. The configuration may not be provided when the outer edge of the saturable absorber 130 is positioned inside the outer edge of at least one of the first optical fiber 110 and the second optical fiber 120 when viewed in the thickness direction.

Although an example in which the saturable absorber 130 is circular when viewed in the thickness direction is illustrated in the above embodiment, the saturable absorber 130 may have an elliptical shape or an oval shape (that is, a rounded rectangular shape or a track shape) when viewed in the thickness direction. In this case, the saturable absorber 130 is unlikely to peel off from the first optical fiber 110 and the second optical fiber 120 as in a case where the saturable absorber 130 is circular when viewed in the thickness direction. As a result, the adhesiveness between the saturable absorber 130 and the first and second optical fibers 110 and 120 can be further enhanced.

Although an example in which the saturable absorber 130 is circular when viewed in the thickness direction is illustrated in the above embodiment, the saturable absorber 130, when viewed in the thickness direction, may be polygonal with its corner portion square-chamfered or round-chamfered. The square chamfering is so-called C chamfering. The round chamfering is so-called R chamfering. In this case, the saturable absorber 130 is less likely to peel off, as in a case where the saturable absorber 130 is circular when viewed in the thickness direction, than in a case where the saturable absorber 130 has a corner portion. As a result, the adhesiveness between the saturable absorber 130 and the first and second optical fibers 110 and 120 can be further enhanced.

Although an example in which the saturable absorber 130 is a sheet-shaped sheet body containing carbon nanotubes is illustrated in the above embodiment, the saturable absorber 130 may be a semiconductor substrate. Examples of the semiconductor substrate include a semiconductor substrate manufactured by BATOP GmbH, having a size of 5 mm by 5 mm (five square millimeters), and having a thickness of hundreds of micrometers.

REFERENCE SIGNS LIST

1: supercontinuum light source, 10: pulse laser device, 100: fiber structure, 110: first optical fiber, 110a: tip portion, 111: first core, 112: first cladding, 113: first ferrule, 120: second optical fiber, 120a: tip portion, 121: second core, 122: second cladding, 123: second ferrule, 130: saturable absorber, 130f: adsorption instrument, 140: housing, 133: Newton ring, 134: dent.

The invention claimed is:

1. A fiber structure comprising:
    first and second optical fibers disposed such that tip portions thereof butt; and
    a sheet-shaped saturable absorber sandwiched between the tip portion of the first optical fiber and the tip portion of the second optical fiber, wherein
    each of the tip portions of the first optical fiber and the second optical fiber has a core, a cladding provided around the core, and a ferrule provided around the cladding,
    the tip portion of the first optical fiber has a protruding shape protruding to a tip side,
    the saturable absorber has an adhering part at least adhering to the core of the first optical fiber and a non-adhering part present around the adhering part and not adhering to the tip portion of the first optical fiber,
    the adhering part adheres to the core and the cladding of the first optical fiber, and
    the tip portion of the first optical fiber and the tip portion of the second optical fiber butt such that a dent corresponding to a shape of the cladding of the first optical fiber adhering at the adhering part is formed in the saturable absorber.

2. The fiber structure according to claim 1, wherein
    the tip portion of the second optical fiber has a protruding shape protruding to a tip side,
    the adhering part at least adheres to the core of the second optical fiber, and
    the non-adhering part does not adhere to the tip portion of the second optical fiber.

3. The fiber structure according to claim 2, wherein
    the adhering part adheres to the core and the cladding of the second optical fiber, and
    the tip portion of the first optical fiber and the tip portion of the second optical fiber butt such that a dent corresponding to a shape of the cladding of the second optical fiber adhering at the adhering part is formed in the saturable absorber.

4. The fiber structure according to claim 1, wherein an outer edge of the saturable absorber is positioned inside an outer edge of at least one of the first optical fiber and the second optical fiber when viewed in a thickness direction of the saturable absorber.

5. The fiber structure according to claim 1, wherein the saturable absorber has a polygonal shape in which a corner portion is square-chamfered or round-chamfered when viewed in the thickness direction of the saturable absorber.

6. The fiber structure according to claim 1, wherein the saturable absorber has a circular shape, an elliptical shape, or an oval shape when viewed in the thickness direction of the saturable absorber.

7. The fiber structure according to claim 1, wherein the saturable absorber contains a sheet-shaped resin and a plurality of carbon nanotubes dispersed in the resin.

8. A pulse laser device comprising the fiber structure according to claim 1.

9. A supercontinuum light source comprising the pulse laser device according to claim 8.

10. A production method for a fiber structure comprising:
    a first step of preparing a sheet-shaped saturable absorption material and first and second optical fibers;
    a second step of forming a sheet-shaped saturable absorber by punching the saturable absorption material;
    a third step of adsorbing the saturable absorber with an adsorption instrument;
    a fourth step of placing the saturable absorber adsorbed by the adsorption instrument in a tip portion of the first optical fiber; and
    a fifth step of causing the tip portion of the first optical fiber and a tip portion of the second optical fiber to butt such that the saturable absorber is sandwiched between the tip portion of the first optical fiber and the tip portion of the second optical fiber, wherein each of the tip portions of the first optical fiber and the second optical fiber has a core, a cladding provided around the core, and a ferrule provided around the cladding, the tip portion of the first optical fiber has a protruding shape protruding to a tip side, in the fourth step, the saturable absorber is placed in the tip portion of the first optical fiber such that an adhering part at least adhering to the core of the first optical fiber and a non-adhering part present around the adhering part and not adhering to the tip portion of the first optical fiber are formed in the saturable absorber, in the fourth step, the saturable absorber is placed in the tip portion of the first optical fiber such that the adhering part adheres to the core and the cladding of the first optical fiber, and in the fifth step, the tip portion of the first optical fiber and the tip portion of the second optical fiber are caused to butt such that a dent corresponding to a shape of the cladding of the first optical fiber adhering at the adhering part is formed in the saturable absorber.

11. The production method for a fiber structure according to claim 10, wherein the tip portion of the second optical fiber has a protruding shape protruding to a tip side, and in the fifth step, the tip portion of the first optical fiber and the tip portion of the second optical fiber are caused to butt such that the adhering part at least adheres to the core of the second optical fiber and the non-adhering part does not adhere to the tip portion of the second optical fiber.

12. The production method for a fiber structure according to claim 11, wherein, in the fifth step, the tip portion of the first optical fiber and the tip portion of the second optical fiber are caused to butt such that a dent corresponding to a shape of the cladding of the second optical fiber adhering at the adhering part is formed in the saturable absorber.

13. The production method for a fiber structure according to claim 10, wherein, in the fourth step, the saturable absorber is placed in the tip portion of the first optical fiber such that an outer edge of the saturable absorber is positioned inside an outer edge of the first optical fiber when viewed in a thickness direction of the saturable absorber.

14. The production method for a fiber structure according to claim 10, wherein, in the fifth step, the tip portion of the first optical fiber and the tip portion of the second optical fiber are caused to butt such that the outer edge of the saturable absorber is positioned inside an outer edge of the second optical fiber when viewed in the thickness direction of the saturable absorber.

15. The production method for a fiber structure according to claim 10, wherein, in the fourth step, a Newton ring containing interference fringes generated at the non-adhering part of the saturable absorber is formed in the saturable absorber.

16. The production method for a fiber structure according to claim 10, further comprising a sixth step of accommodating the tip portion of the first optical fiber and the tip portion of the second optical fiber in a housing.

17. The production method for a fiber structure according to claim 10, wherein the saturable absorber has a polygonal shape in which a corner portion is square-chamfered or round-chamfered when viewed in the thickness direction of the saturable absorber.

18. The production method for a fiber structure according claim 10, wherein the saturable absorber has a circular shape, an elliptical shape, or an oval shape when viewed in the thickness direction of the saturable absorber.

* * * * *